(12) United States Patent
Puranik

(10) Patent No.: US 7,496,347 B2
(45) Date of Patent: Feb. 24, 2009

(54) METHOD AND APPARATUS FOR PROVIDING SECURE WIRELESS COMMUNICATION

(75) Inventor: Gagan Puranik, Madison, MS (US)

(73) Assignee: Velocita Wireless LLC, Woodbridge, NJ (US)

( * ) Notice: Subject to any disclaimer, the term of this patent is extended or adjusted under 35 U.S.C. 154(b) by 94 days.

(21) Appl. No.: 11/128,484

(22) Filed: May 13, 2005

(65) Prior Publication Data

US 2006/0105740 A1   May 18, 2006

Related U.S. Application Data

(60) Provisional application No. 60/627,785, filed on Nov. 12, 2004.

(51) Int. Cl.
*H04M 3/16* (2006.01)
(52) U.S. Cl. .................. 455/410; 713/155
(58) Field of Classification Search .......... 455/410, 455/411, 412.1, 412.2; 713/150, 155, 172; 380/28, 249, 270, 277
See application file for complete search history.

(56) References Cited

U.S. PATENT DOCUMENTS

| | | | | |
|---|---|---|---|---|
| 5,517,568 A | * | 5/1996 | Grube et al. | 380/250 |
| 6,718,024 B1 | * | 4/2004 | Heilmann et al. | 379/189 |
| 7,110,539 B1 | * | 9/2006 | Bao et al. | 380/28 |
| 2005/0015604 A1 | * | 1/2005 | Sundarajan et al. | 713/184 |
| 2006/0101288 A1 | * | 5/2006 | Smeets et al. | 713/194 |

OTHER PUBLICATIONS

"Advanced Encryption Standard (AES)", NIST FIPS PUB 197, Nov. 2001.
"X9.63 Key Management Protocol", Paging Technical Committee (PTC) Engineering, Standards and Publications Document RFC 41, Mar. 12, 2003.

* cited by examiner

*Primary Examiner*—Sam Bhattacharya
(74) *Attorney, Agent, or Firm*—Day Pitney LLP

(57) ABSTRACT

An approach is provided for securely communicating in a wireless network. A cryptographic server generates a command to enable a secure mode of operation for a wireless device, wherein the wireless device can operate in a secure mode and an unsecure mode in support of two-way messaging. The cryptographic server sends the command to the wireless device to activate the secure mode of operation. The secure mode of operation provides transmission of an encrypted message by the wireless device over the wireless network.

27 Claims, 14 Drawing Sheets

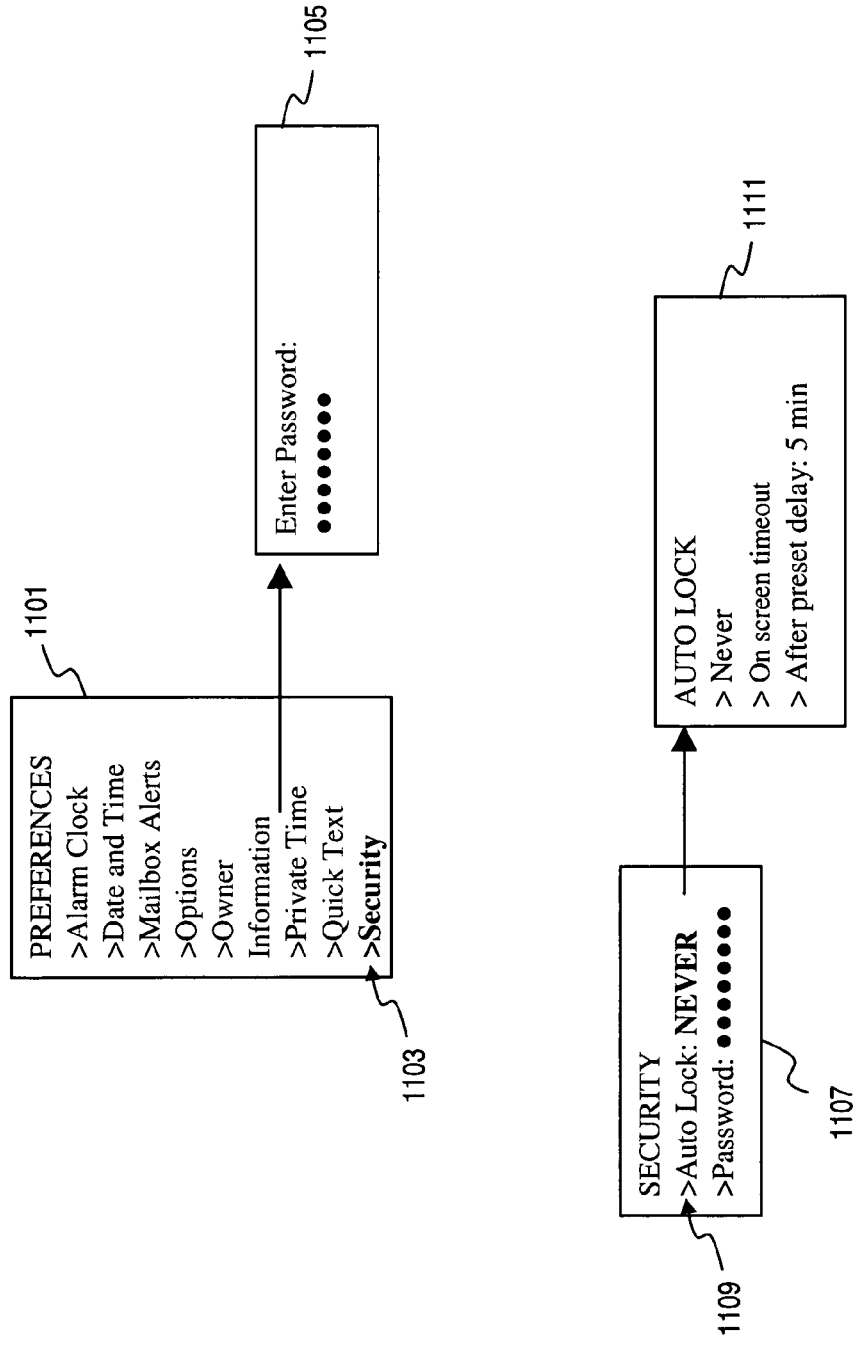

METHOD AND APPARATUS FOR PROVIDING SECURE WIRELESS COMMUNICATION

RELATED APPLICATIONS

This application is related to, and claims the benefit of the earlier filing date under 35 U.S.C. § 119(e) of, U.S. Provisional Patent Application (Ser. No. 60/627,785) filed Nov. 12, 2004, entitled "Two-way Messaging with Encryption"; the entirety of which is incorporated herein by reference.

FIELD OF THE INVENTION

The present invention relates to communications, and more particularly, to secure wireless communication.

BACKGROUND OF THE INVENTION

Wireless networks, such as paging systems, permit users to communicate with great convenience on a store-and-forward manner or real-time basis. Because of the broadcast nature of these networks, security is a paramount concern. Traditionally, commercial paging systems lack adequate security or require significant change in the hardware and software infrastructure to effect an acceptable level of security. Inadequacy of security measures has limited the types of service offerings and their appeal to customers who place a high premium on privacy and confidentiality. These customers largely include business entities that process highly confidential data, for example, financial and medical information. A further consideration in deploying effective security mechanisms in a wireless network is the impact on the user device, in terms of user interface. That is, the ease or user friendliness of existing wireless devices must be maintained or enhanced.

Another application for a wireless system is telemetry services, notably fleet and asset management. The management of vehicles within a fleet as well as assets involves obtaining information, generally in real-time, about the location and movement of these objects. The fleet manager utilizes this information to maximize use of fleet resources. Customers may view such information as confidential, and thus, may require that such communication is securely exchanged.

Therefore, there is a need for a security mechanism that can be readily deployed in a wireless network, without altering the existing infrastructure or introducing complexity in the end user devices.

SUMMARY OF THE INVENTION

These and other needs are addressed by the present invention, in which an approach for secure messaging over a wireless network is provided.

According to one aspect of the present invention, a method for communicating in a wireless network is disclosed. The method includes generating a command to enable a secure mode of operation for a wireless device, wherein the wireless device is configured to operate in a secure mode and an unsecure mode in support of two-way messaging. The method also includes transmitting the command to the wireless device to activate the secure mode of operation. The secure mode of operation provides transmission of an encrypted message by the wireless device over the wireless network.

According to another aspect of the present invention, a network apparatus for supporting secure communication over a wireless network is disclosed. The apparatus includes a processor configured to generate a command to enable a secure mode of operation for a wireless device, wherein the wireless device is configured to operate in a secure mode and an unsecure mode in support of two-way messaging. Additionally, the apparatus includes a communication interface configured to transmit the command to the wireless device to activate the secure mode of operation, wherein the secure mode of operation provides transmission of an encrypted message by the wireless device over the wireless network.

According to another aspect of the present invention, a method for communicating in a wireless network is disclosed. The method includes switching from an unsecure mode of operation to a secure mode of operation. The method also includes establishing a shared secret key with a cryptographic server over the wireless network in support of two-way messaging. Further, the method includes generating an encrypted message using the shared secret key.

According to yet another aspect of the present invention, a device for communicating in a wireless network is disclosed. The device includes means for switching from an unsecure mode of operation to a secure mode of operation. The device also includes means for establishing a shared secret key with a cryptographic server over the wireless network in support of two-way messaging. Further, the device includes means for generating an encrypted message using the shared secret key.

Still other aspects, features, and advantages of the present invention are readily apparent from the following detailed description, simply by illustrating a number of particular embodiments and implementations, including the best mode contemplated for carrying out the present invention. The present invention is also capable of other and different embodiments, and its several details can be modified in various obvious respects, all without departing from the spirit and scope of the present invention. Accordingly, the drawing and description are to be regarded as illustrative in nature, and not as restrictive.

BRIEF DESCRIPTION OF THE DRAWINGS

The present invention is illustrated by way of example, and not by way of limitation, in the figures of the accompanying drawings and in which like reference numerals refer to similar elements and in which:

FIG. 11A-11D are diagrams of a user interface of the devices used in the system of FIG. 1, according to an embodiment of the present invention.

DESCRIPTION OF THE PREFERRED EMBODIMENT

An apparatus, method, and software for secure communication over a wireless network are described. In the following description, for the purposes of explanation, numerous specific details are set forth in order to provide a thorough understanding of the present invention. It is apparent, however, to one skilled in the art that the present invention may be practiced without these specific details or with an equivalent arrangement. In other instances, well-known structures and devices are shown in block diagram form in order to avoid unnecessarily obscuring the present invention.

Figure 1:
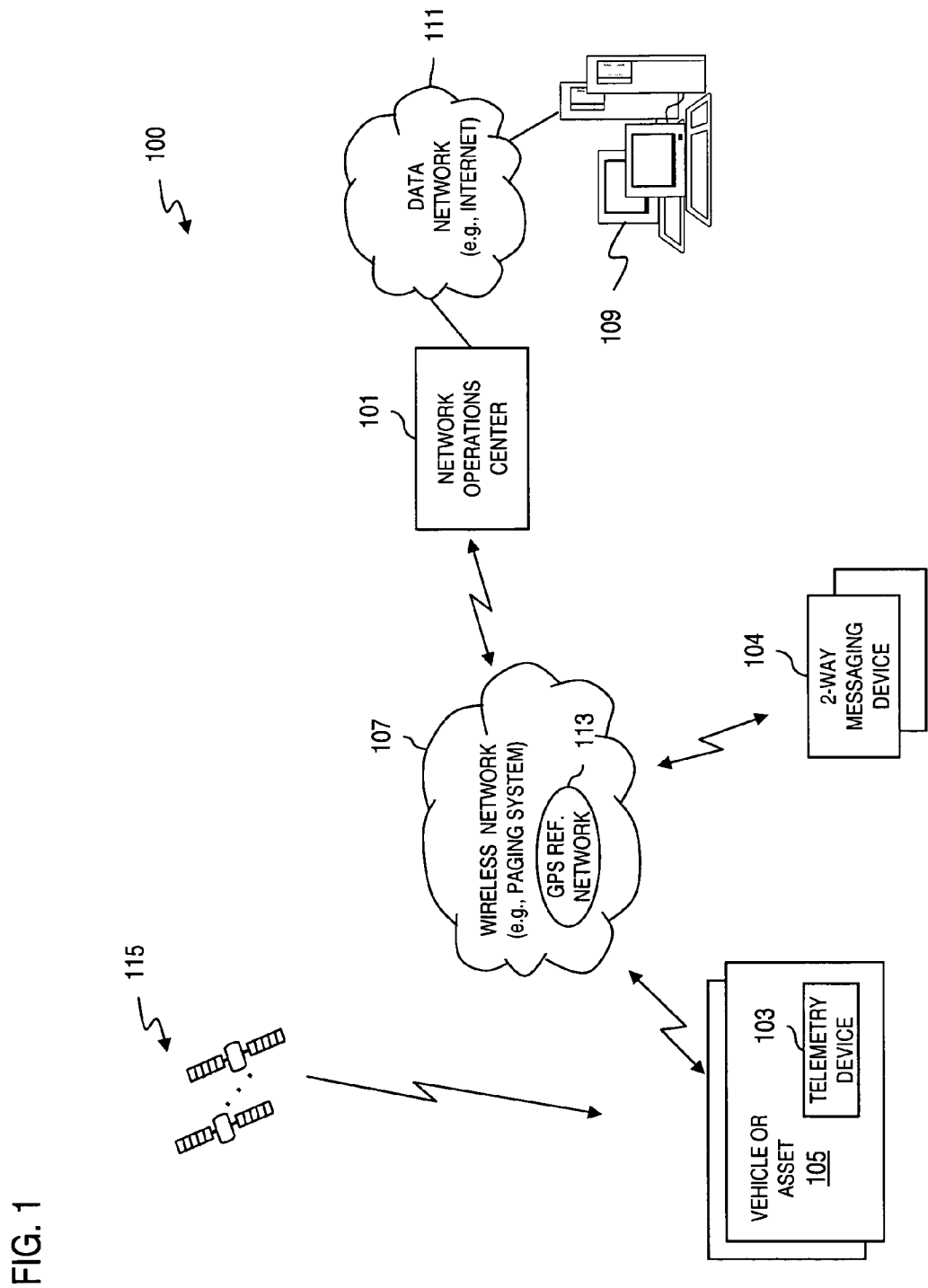
FIG. 1 is a diagram of a wireless network capable of providing unsecure and secure modes of operation, according to an embodiment of the present invention.

FIG. 1 is a diagram of a wireless network capable of providing unsecure and secure modes of operation, according to an embodiment of the present invention. The system 100 provides, in an exemplary embodiment, two-way paging services as well as fleet and asset tracking. The system 100 utilizes a combination of autonomous GPS and Assisted GPS (A-GPS); in particular, mobile-centric A-GPS. The system 100 includes a Network Operation Center (NOC) 101 that provides both secure and unsecure over-the-air communications for telemetry devices 103 and two-messaging devices 104. For tracking telemetry devices 103, which can be resident within vehicles 105. Moreover, it is contemplated that the telemetry device 103 can be affixed to an asset (or any other object).

A wireless network 107 supports two-way communication among the telemetry devices 103 and the NOC 101. In an exemplary embodiment, the wireless network 107 is a two-way paging system employing the ReFLEX™ protocol by Motorola for two-way advanced messaging. The wireless network 107 provides over-the-air encrypted messages for secure communication through establishment of a highly secure area (SA) in the NOC 101. According to one embodiment of the present invention, the system 100 supports advanced cryptographic techniques for the transfer and administration of complex and highly secure encryption keys. By way of example, the Advanced Encryption Standard (AES) in Counter (CTR) mode is used for over-the-air encryption. AES is detailed in NIST, FIPS PUB 197, entitled "Advanced Encryption Standard (AES)," November 2001; which is incorporated herein by reference in its entirety. CTR mode of AES is well suited for ReFLEX™ network as it does not propagate errors and utilizes minimal overhead. Additionally, only one function (encrypt) is adequate to handle both encryption and decryption. The protocol for the secured messaging can be found in the Paging Technical Committee (PTC) Engineering Standards and Publications document RFC 30 which describes the method identifier "0x61" defining how AES should be implemented in a ReFLEX™ network. This highly secure system 100 can operate within the constraints, for example, of a micro-powered handheld two-way messaging device, such as devices 104, without diminishing the ease of sending or reading messages.

Messages are created on the 2-way messaging device 104 and readily encrypted for transmission over the network 107. Once enabled for a particular customer, all messages delivered to/from the corresponding 2-way messaging devices 104 will be encrypted. The 2-way messaging device 104 places the clear-text of the message into the outbox. When the device 104 is ready to transmit the message, it will be encrypted and sent over the normal wireless network 107 using the ReFLEX™ protocols. When received by the NOC 101, the system 100 checks to determined whether the received message is a secured message. If the message is secured, the message is sent to a cryptographic server (i.e., crypto server) within the NOC 101 for decoding along with the address of the sending unit. The operation of the crypto server is more fully described below in FIG. 2. When the 2-way messaging device 104 receives the secured message, the device decrypts the message, places the clear text of the message into the inbox, and alerts the owner that a message has arrived.

Advantageously, the operation, coordination, and administration of the encryption process is transparent to the end user, and therefore, maintains the existing ease of use of the wireless network 107 as a paging system.

For secure messages exchanged with the telemetry devices 103, the NOC 101 can accordingly encrypt and decrypt such messages. The telemetry devices 103 have two modes of operation: autonomous GPS mode, and A-GPS mode. When operating in A-GPS mode, the system 100 can provide for better in building or obstructed view geolocation with in a paging system zone. When out of network coverage, the autonomous GPS may be used to obtain geolocation data that may be stored on the device for later transmission.

The NOC 101 provides the necessary fleet and asset management functions, such as user account creation and management, access control, and deployment of business rules. The NOC 101 also supports remote management capabilities by hosts 109 over a data network 111, such as the global Internet.

To better understand the hybrid A-GPS environment of the system 100, it is instructive to describe the operation of the general operation of a mobile-centric A-GPS system. The telemetry device 103 has GPS hardware and intelligence, whereby the network 107 in conjunction with the NOC 101 employs mechanisms for providing GPS aiding data (or assistance data). The network 107 includes base transmitters and some base receivers containing GPS hardware from which the ephemeris and approximate location can be obtained, constituting a GPS reference network 113. The GPS reference network 113 utilizes multiple GPS satellites 115.

The assistance data that is transmitted to the devices 103, in an exemplary embodiment, can include ephemeris data differential GPS correct data, timing data and/or other aiding data. Using the aiding (or assistance) data, the telemetry devices 103 performs geolocation calculations, yielding a number of advantages. For example, the telemetry devices 103 can generate real-time speed and route adherence alerts. Additionally, transmission of geolocation data need not be frequent. Transmission of geolocation data is more compact because it is true location rather than pseudo range data. Also, the telemetry devices 103 can more intelligently request assistance data because the devices 103 themselves can determine when the ephemeris data is no longer valid.

The hybrid A-GPS system 100 thus permits fast and precise geolocation when in network coverage of the network 107, while providing immunity from obstructed view of the sky. Also, when the switch is made to autonomous GPS mode (when outside of the coverage area of the network 101), the devices 103 can still obtain geolocation data. This data can be stored within the device 103 and transmitted to the NOC 101 when the associated vehicle 105 returns to the network coverage area.

As noted earlier, the telemetry devices 103 may be attached to a host entity such as a vehicle or other valuable asset. The device may be used to track, monitor, and control aspects of the host entity. These devices 103 are configurable with respect to the existence and number of digital inputs/outputs (I/O), analog inputs/outputs (I/O), and device port interfaces for connection with peripheral devices. By way of examples, the digital inputs can be used to monitor various components of the vehicles 105: ignition status, door lock status, generic switch status, headlight status, and seat occupancy status. The digital outputs can be used to control, for example, the starter, and door locks, and to monitor such parameters as engine temperature, cargo temperature, oil pressure, fuel level, ambient temperature, and battery voltage. The exact configuration of the telemetry devices 103 can be based on cost consideration and/or applications.

The telemetry devices 103, in an exemplary embodiment, employ a wireless protocol to receive commands and transmit data and alerts (e.g., high speed alert) over the radio network 107. The telemetry devices 103 can queue alerts, message responses, and scheduled data, whereby if the devices 103 are unable to send the messages, the messages are queued and sent when the device 103 returns to wireless network coverage. Prioritized queues are used and include, for example, queues for high, normal, and low priority messages. In the exemplary implementation, critical device status changes are given highest priority, while other alerts and responses are given normal priority. Scheduled data messages are given the lowest priority. The queues are configured, as first in yields first out, wherein new messages are dropped when its corresponding queue is full. This arrangement advantageously allows for the status of the device 103 at the time of transmission failure to be known even when the data stored in the data log at time of the transmission has been overwritten.

The telemetry devices 103 can also respond to status (e.g., of position, speed, digital I/O port status, analog input channel status, peripheral status or other device status) queries transmitted by the NOC 101. The status query may request either current status or status within a time and date range. The device 103 responds to the query with either the current status or all status within the date and time range that is currently stored in the device's data log.

As regards data logging, the devices 103 support use of one or more schedules for the data acquisition. The data logging involves storing of the data locally on the device 103. This data, which can include position, speed, digital I/O port status, analog input channel status, peripheral status or other device status is not automatically transmitted over the air. Instead, the data is stored for a finite period of time and made available for use by scheduled data acquisitions, data acquisitions on demand, and data acquisitions associated with alerts. The data log is circular in that when the last available memory for the data logger has been written, the data logger begins recording new data at the first location of memory available for the data logger.

With scheduled acquisitions of the data collected by the data logger, the data within the data log is transmitted by the device 103 according to a configurable schedule at the configured transmission rate. Multiple schedules may be configured on the device 103. Schedules are configured to obtain data at a regular interval based upon calendar time and date. Schedules may be configured such that they are enabled and disabled based upon status of a digital input. For example, an ignition status input may be used to turn a schedule on when the engine is On and turn the schedule off when the engine is Off. A Response (or Data) Message Window value can be configured on the device 103, such that the device 103 delays sending scheduled data using an Offset within the Data Message Window. That is, the scheduled transmit time is adjusted by the Offset, the device 103 delays queuing the scheduled data until the time is equal to the transmit time plus the Offset. Use of the Data Message Window helps prevent overwhelming the wireless network 107 when many devices are scheduled to transmit data at the same time. For example, it is likely that many schedules will be based upon transmitting on the hour, half past the hour, or at fifteen minute intervals. Using the Offset ensures that the scheduled data transmissions from all of the devices with similar schedules are not sent at precisely the same time. Given the precision of the telemetry device's clock (as it is based upon GPS time), this randomization of regularly scheduled device transmissions is particularly useful.

The telemetry devices 103 can be configured to monitor a variety of information relating to the vehicle or asset through the digital I/O and analog I/O. For instance, alerts can be used to indicate status change of the digital inputs. Each Digital Input Status Change Alert can be enabled and disabled through configuration. The alert may be configured to transmit other device status recorded at the time of the alert such as position, speed, status of other digital I/O ports, analog input status, peripheral status, or other device status. As regards the digital output, the status of each available digital output can be changed or read.

Similarly, the statuses of analog inputs of the devices 103 are monitored for change. In an exemplary embodiment, multiple threshold levels (e.g., high and low) can be set, whereby alerts are generated (e.g., Low Range Entry alert, Low Range Exit, High Range Entry, and High Range Exit). That is, if the value of the Analog Input falls below the Low Threshold, a Low Range Entry Alert is generated. If the value of the Analog Input rises above the Low Threshold plus a Hysteresis is value, a Low Range Exit Alert is generated. In similar fashion, if the value of the Analog Input rises above the High Threshold, a High Range Entry Alert is output from the device 103. Also, if the value of the Analog Input falls below the High Threshold minus a Hysteresis value, a High Range Exit Alert is generated. The alert may be configured to transmit other device status recorded at the time of the alert such as position, speed, status of other digital I/O ports, analog input status, peripheral status, or other device status.

By way of example, the devices 103 can be used to monitor excessive speed via a High Speed Alert Control, whereby a High Speed Threshold can be set by a fleet manager. In addition, a duration parameter (i.e., High Speed Duration) can be utilized to specify the time at which the High Speed Threshold must be exceeded before an alert is generated. Further, a configurable High Speed Hysteresis parameter is set as the delta change below the High Speed Threshold used to determine when the High Speed Threshold has no longer been exceeded. The alert may be configured to transmit other device status recorded at the time of the alert such as position, speed, status of other digital I/O ports, analog input status, peripheral status, or other device status.

The system 100 also permits users via the hosts 109 to specify and configure areas of interest within the coverage area of the network 101 such that alerts can be generated when a device 103 enters or exits the configured areas. The alert may be configured to transmit other device status recorded at the time of the alert such as position, speed, status of other digital I/O ports, analog input status, peripheral status, or other device status.

It is recognized that a tremendous amount of data and associated alerts can result. Therefore, filtering such data is useful, particularly if the data is inaccurate. Notably, GPS positional data can be erroneous due to environmental conditions, which can cause errors or distortions of the GPS signal received by the devices 103. For example, small position changes can sometimes be detected on non-moving vehicles, as well as excessive speeds and erroneous positions. Consequently, such errant information is filtered, in an exemplary embodiment, at a gateway within the NOC 101. The data collected and transmitted by the telemetry devices 103 are processed by the NOC 101, the components of which are described in FIG. 2.

Figure 2:
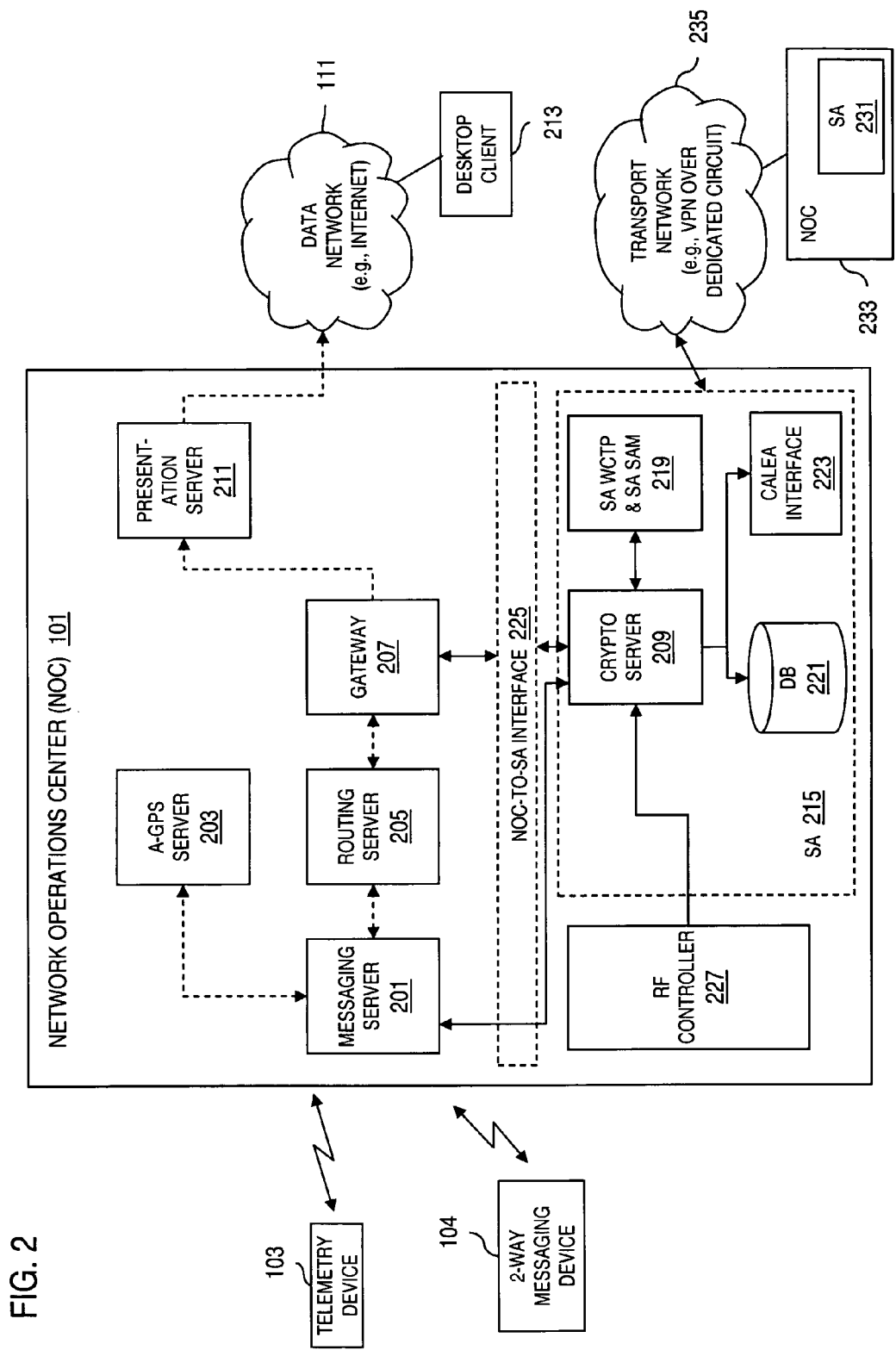
FIG. 2 is a diagram of a Network Operations Center (NOC) in the system of FIG. 1, according to an embodiment of the present invention.

FIG. 2 is a diagram of a Network Operations Center (NOC) in the system of FIG. 1, according to an embodiment of the present invention. According to an embodiment of the present invention, each device 103, 104 on the wireless network 107 has a profile that contains various bits of information about the unit and is maintained by the NOC 101. The devices 103, 104 that are capable of decryption and have been enabled for a secure communication service are specified accordingly in their respective profiles. Such devices 103, 104 can receive all of their messages encrypted. The profile optionally can indicate that particular encryption algorithm is being used if multiple cryptographic servers (i.e., "crypto server") are utilized. For example, a customer may request to have its own crypto server hosted at the NOC 101, whereby all of the customer's messages are processed by the particular crypto server for encryption and decryption.

The NOC 101 utilizes, in this exemplary embodiment, a client-server architecture to support the wireless devices 103, 104. Specifically, the NOC 101 houses a messaging server 201 for sending and receiving messages to the devices 103, 104 over the air, for storing the messages, and routing these messages to their destination. The NOC 101 provides connectivity via a local area network (LAN) (not shown) for the messaging server 103 with an A-GPS server 203, a routing server 205, and a gateway 207. The gateway 207 communicates with a security server (i.e., cryptographic server) 209 to support encryption and decryption of the messages.

A presentation server 211 resides within the NOC 101 to interface with the data network 111 (e.g., the global Internet), such that the host 109 can access the services of the fleet and asset management system. The host 109 under this scenario is loaded with a desktop client 213. Although a single server is shown for the presentation server 211, in the alternative, the server 211 can functionally be implemented as three separate servers: a database server, a middleware server, and a web server. The database server is responsible for data storing, data updating, and data retrieval as well as providing a set of interfaces to achieve these functions. The web server is responsible for serving maps, presenting user interfaces to manage and control user administration, device configuration, and etc. The middleware server can be deployed between the database server and the web server, and has the following responsibilities: converting the web server's data retrieval requests to database server Application Programming Interfaces (APIs) and then sending to database server, receiving the responses from the database server and then sending back to web server, receiving data from gateway 207 and then sending requests to the database to store/update data records. Because of the modularity in this design, these three components can reside on the same machine, as shown in FIG. 2, or reside in multiple platforms.

Messages from the wireless devices 103 and 104 are forwarded by the messaging server 201 to either the A-GPS server 203 or the routing server 205 depending on the type of device. For example, in the case of the telemetry devices 103, if the message is an assist request, the message is sent to the A-GPS server 203. In response to the GPS assist request, the A-GPS server 203 determines GPS assistance data for transmission to the requesting telemetry device 103.

The A-GPS server 203 obtains ephemeris data from the GPS reference network 113, and determines satellite configuration for each of the geographic zones comprising the wireless network. The A-GPS server 203 also determines the assistance data for each geographic zone. The NOC 101 then periodically broadcasts the assistance data to each geographic zone. In addition, the A-GPS server 203 supplies GPS assistance data to any telemetry device 103 that requests the GPS assistance data. When supporting this request, the NOC 101 determines approximate location of the requesting device 103 based upon base receivers that received the request, using a type of triangulation. Subsequently, a GPS Assistance message is generated by the A-GPS server 203 to send to the telemetry device 203 based upon its approximate location. The messaging server 201 sends the GPS Assistance message to the particular telemetry device 103.

Thus, the A-GPS server 203 delivers GPS assistance data through two mechanisms by periodically broadcasting GPS assistance data to all devices 103 in each of the geographic zones covered by the wireless network 107, or by responding to specific requests by the telemetry devices 103 for GPS assistance data.

The routing server 205 has responsibility for routing of the messages from the wireless devices 103 and 104, and managing such messages from the devices 103, 104 to their server destinations. Each device 103 can be configured to have messages directed to one or more destination servers. The routing server 205, upon receiving message from the wireless device 103 and 104, determines a destination address that has been configured for the device 103 and 104 and modifies the destination address accordingly. The message is then forwarded to the configured destination. According to one embodiment of the present invention, by default, the messages are directed to the gateway 207.

The gateway 207 interfaces with the presentation server 211 to permit the desktop client 213 access to the fleet and asset management or messaging services. The gateway 207 provides translation of wireline messages and commands from the presentation server 211 to the wireless protocol for communication with the telemetry devices 103. For example, the gateway 207 supports an eXtensible Markup Language (XML) interface, such that XML commands submitted to the gateway 207 over wireline are converted to the wireless protocol commands and sent over the paging network 107 to the devices 103. In turn, the wireless protocol messages received from the devices 103 are converted to wireline XML messages. The gateway 207 provides translation of wireline messages and commands from the host 109 to the wireless protocol for communication with the telemetry devices 103. In turn, the wireless protocol messages received from the devices 103 are converted to wireline XML messages and sent to host 109.

The presentation server 211 provides the following functions: messaging, fleet and asset tracking, and general purpose I/O monitoring and control. The server 211 also maintains a database (not shown) for user accounts and other related data (e.g., configuration data, user management information, device management, and data acquired from the devices 103). The presentation server 211, as mentioned, also generates the maps corresponding to where the devices 103 are tracked and the mapping preferences configured. Using the desktop client 213, a user can even issue requests to command a particular device 103, such as requesting location of the device 103.

With the presentation server 211 as a front end, a user via the desktop client 213 can configure the telemetry devices 103 via web interfaces. In an exemplary embodiment, the server 211 is a World Wide Web ("web") application server to support a web browser based front-end for the desktop clients 109. The web application server (not shown) can be deployed to support such web interfaces as a set of Java Server Pages (JSP) and Java Applet to interact with the user on the desktop client 213. On the backend, based on data collected by JSP and Java Applet, the web server can generate the proper XML commands that are compliant with Application Programming Interface (API) of the presentation server 211. Consequently, the collected records can be stored in the database of the presentation server 211. The database also stores the properties of the telemetry devices 103, such as the alerts and thresholds.

The desktop client 213 interfaces to the system 100 through the presentation server 211. From the desktop client 213, the user logs in to the system 100. The presentation server 211 can also perform authentication as well as administration tasks such as adding new users or devices 103. The user can also configure business rules executed by the presentation server 211, wherein the business rules logic uses this user supplied configuration to configure the devices 103, acquire, and process data from the devices 103.

Additionally, the presentation server 211 provides a reporting capability based on the stored information in the database. The presentation server 211 can support standard reports or customize reports to the user via the desktop client 213.

Instead of using a desktop client 213, the user, if associated with a large organization, can utilize an enterprise server to obtain all of the user functionality through the gateway 207 using the API of the system 100. Accordingly, the enterprise server would possess the functional capabilities of the presentation server 211, but would be managed by the customer (or user) at the customer's premise.

As noted, the wireless protocol supports communications between the NOC 101 and the wireless devices 103 and 104. In an exemplary embodiment, the messaging is performed according the FLEXsuite Uniform Addressing & Routing (UAR) protocol (developed by MOTOROLA). The wireless protocol message, which can be encapsulated with an UAR message, can be unencrypted or encrypted.

As seen in FIG. 2, the NOC 101 houses a Secure Area (SA) 215. The SA 215 can be implemented as a physically secured area for housing a crypto server 209, whereby personnel is screened and will have limited, controlled access. That is, all activity in this area including entry, and exit by users are recorded. Additionally, remote access into the SA 215 is highly restricted and rigorously monitored.

The crypto server 209 interacts with a SA (Secure Area) Wireless Communication Transfer Protocol (WCTP) and SA Send A Message (SAM) interface 219. The SA WCTP & SA SAM interface 219, in an exemplary embodiment, supports the Wireless Communication Transfer Protocol (WCTP) features (inbound & outbound) that are currently supported by WCTP NOC interface. The WCTP is a paging standard for sending paging messages over the Internet 111. The crypto server 209 can receive messages destined for the wireless devices 103, 104 from a NOC interface (e.g., email, web, IVR, and WCTP interfaces), an unsecured device, a secured device, or an interface within the SA 215. From the user's perspective, the NOC interfaces are provided for both secure and unsecure communication. These NOC interfaces can be made are optional for secure mode of operation. As a default, all NOC interfaces are enabled. The crypto server 209 determines whether the recipient device is allowed to receive message from the originating device/interface (e.g., NOC interface and unsecured device). If allowed, the crypto server 209 encrypts the message with a symmetric key and sends the encrypted message to device.

The SA WCTP & SA SAM interface 219 provides virtual end-to-end security. In an exemplary embodiment, the interface 219 provides secure messaging over the Internet 111. Messages received via the SA WCTP & SA SAM interface 219 are passed to the crypto server 209, which provides secure messaging over the air. According to one embodiment of the present invention, the interface 219 and the crypto server 209 can be implemented on the same physical box. The crypto server 209 encrypts the clear text message using AES and sends the ciphertext to the wireless device (e.g., telemetry device 103 or 2-way messaging device 104). It is noted that the clear text message, in one embodiment of the present invention, is not logged into a file system or stored in database.

The crypto server 209 communicates with other components and/or processes of the NOC 101 via a NOC-to-SA interface 225. Namely, the crypto server 209 communicates with the messaging server 201. Additionally, the server 209 can communicate with other NOC interfaces and databases, without comprising the security of the wireless devices 103, 104 or the messages.

Also, the crypto server 209 interfaces a database 221 and a CALEA (Communications Assistance for Law Enforcement Act) interface 223. This crypto database 221 holds device keys and security settings for the wireless devices 103, 104, but does not store encrypted messages. The CALEA interface 223 provides clear text message to appropriate government agencies, in accordance with the Law Enforcement Agency (LEA) mandate.

As shown, an RF controller 227 is provided to support routing of secure messages. In particular, the RF controller 227 recognizes the key establishment and secure messages, and routes such messages appropriately. In an exemplary embodiment, if the messages originate from the telemetry device 103, these messages can be routed to the messaging server 201, otherwise, they are routed to the crypto server 209. The RF Controller 227 supports location query request for a particular device (e.g., device 104); this mechanism can used by the crypto server 209 or other subsystems to recover from error scenarios.

In an exemplary embodiment, the gateway 207 provides various core processes that are responsible for handling error messages received from the wireless devices 103, 104.

The SA 215 can be configured for redundancy for high reliability. In accordance with one embodiment of the present invention, to support redundancy, the database 221—which holds device keys and security settings—is replicated between two NOCs 101, 233 over a secure link. By way of example, the NOC 101 can serve as a primary facility, while the NOC 233 is the secondary facility. In case of an emergency or scheduled maintenance, the secondary NOC 233 can be designated as the primary facility.

Firewall rules can be deployed between the two NOCs 101, 233. For example, privileges are appropriately assigned to permit access to the crypto databases only by the respective crypto servers. Also, components with the SA 215, 231 can communicate freely. Messages from the CALEA process (e.g., CALEA 223) to a LEA are secured. A secured port is designated for WCTP & SAM messages from the Internet 111. For database replication between two the NOCs 101, 233, a secure link using, for example, a Virtual Private Network (VPN) over dedicated lines within a transport network 235, is enabled.

Figure 3:
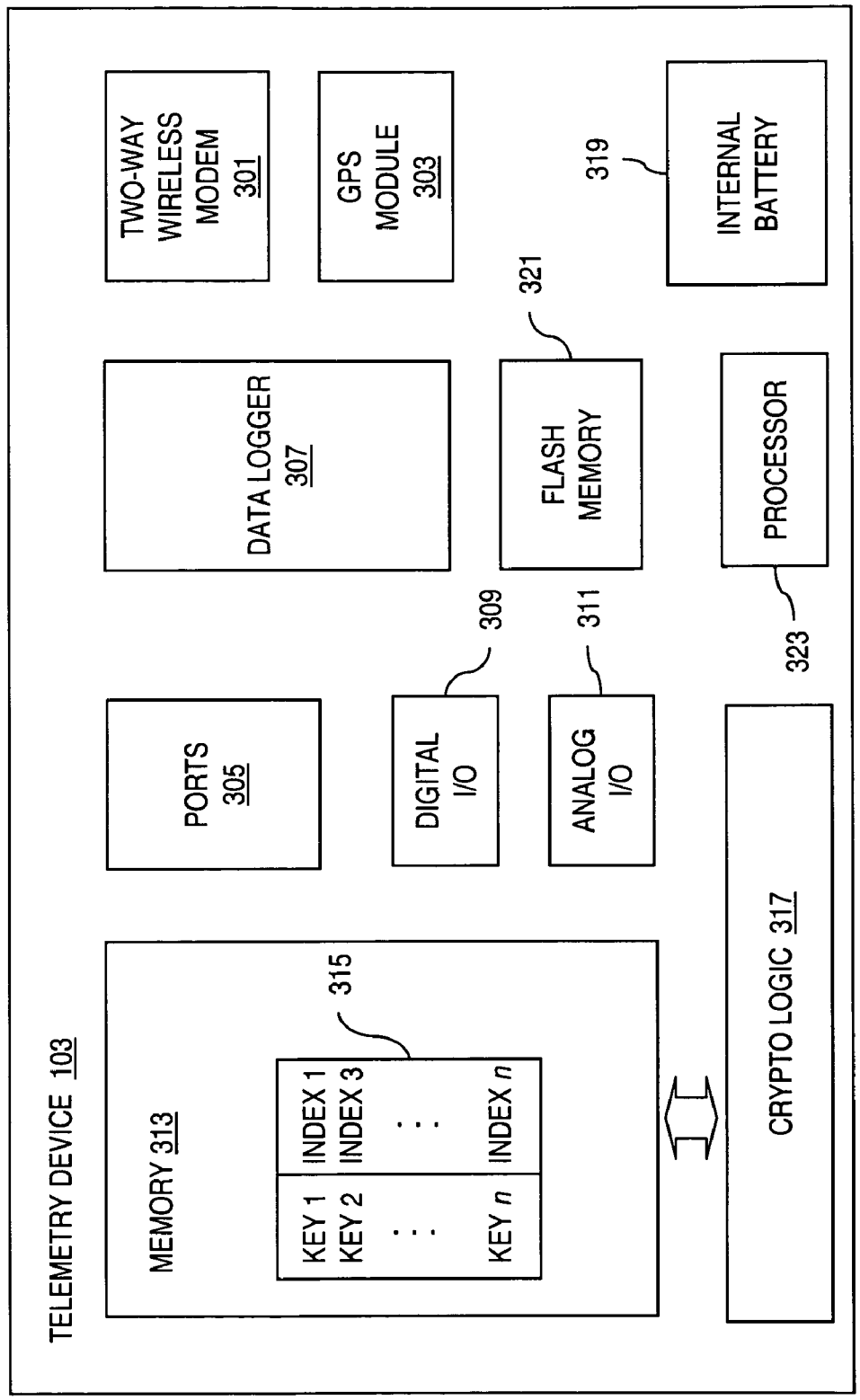
FIG. 3 is a diagram of a wireless device configured to provide secure communication in the system of FIG. 1, according to an embodiment of the present invention.

FIG. 3 shows a diagram of a wireless device used in the system of FIG. 1, according to an embodiment of the present invention. By way of example, the components of the telemetry device 103 are described in the context of a narrowband network, such as a paging system. However, it is contemplated that the components for communications can be tailored to the specific wireless network, and user device (e.g., 2-way messaging device 104). The telemetry device 103 can operate in a secure mode or unsecure mode.

In this exemplary embodiment, the telemetry device 103 includes a two-way wireless modem 301 for receiving and transmitting signals over the wireless network 107 according to the communication protocols supported by the wireless network 107, such as the Motorola ReFLEX™ protocol for two-way paging. By way of example, a Karli ReFLEX™ module by Advantra International can be used for the modem 301. The two-way wireless modem 301 couples to a two-way wireless antenna (not shown) that can be placed local to the device 103 or remote from the device 103 (e.g., 12 or more feet) to enhance flexibility in installation.

The telemetry device 103 also contains a GPS module 303 that is capable of operating in the multiple GPS modes: autonomous GPS mode, and mobile-based A-GPS mode. The GPS module 303 can employ, for example, a GPS receiver manufactured by FastraX—iTrax02/4. In autonomous mode, GPS data may be acquired with no assistance data provided by the wireless network 107. The GPS module 303 operates in the A-GPS mode when the device 103 is in wireless network coverage, in which assistance data is supplied and can include ephemeris data and data to obtain location in obstructed view locations (in building, wooded areas, etc.). Further, the assistance can include differential GPS (DGPS) to enhance location accuracy under some conditions. The GPS module 303 couples to a GPS antenna (not shown) that can be placed local to the device 103 or remote from the device 103 (e.g., 12 or more feet) to enhance flexibility in installation.

Attachment of peripheral modules to the telemetry device 103 are supported by one or more peripheral ports 305. The ports 305, for example, can be used to connect to intelligent peripherals that operate according to business rules and logic. These business rules and logic can be housed in a vehicle harness (not shown), which include an On-Board Diagnostic (OBDII) interface and intelligence. Under this arrangement, a user (e.g., fleet manager) can query any parameter available through the OBDII interface. For example, data obtained for each tracking record can include any combination of the following items: RPM (Revolutions Per Minute), oil pressure, coolant temperature, etc. Such data recorded by the telemetry device 103 is stored in memory 313. The acquisition period for the data is configurable, as well as the transmission interval to the NOC 101. Furthermore, the monitoring and subsequent data exchange can be governed by a configurable schedule, which can specify such parameters as start date, start time, end time, recurrence (e.g., daily, weekly, monthly, etc.), and duration.

Data is logged by a data logger 307, made available for use by scheduled data acquisitions, data acquisitions on demand, and data acquisitions associated with alerts. As mentioned, the telemetry device 103 also can be configured to include digital I/O 309 and analog I/O 311 for monitoring and control of the vehicle or asset. The data logger 307 also collects data associated with these I/O ports 309, 311.

The telemetry device 103 also includes a processor 323 that may handle arithmetic computations, and may support operating system and application processing. The processor 323, while shown as a single block, may be configured as multiple processors, any of which may support multipurpose processing, or which may support a single function.

The memory 313 of the telemetry device 103 can be organized to include multiple queues for prioritizing the messages to be processed by the device 103. In support of secure messaging, the memory 313 stores one or more cryptographic keys 315 using indices. Thus, the device 103 can be motivated to change keys based on received index value. The memory 313, while shown as a single block, may be configured as multiple memory devices, any of which may support static or dynamic storage, and may include code for operating system functionality, microcode, or application code.

Figure 6:
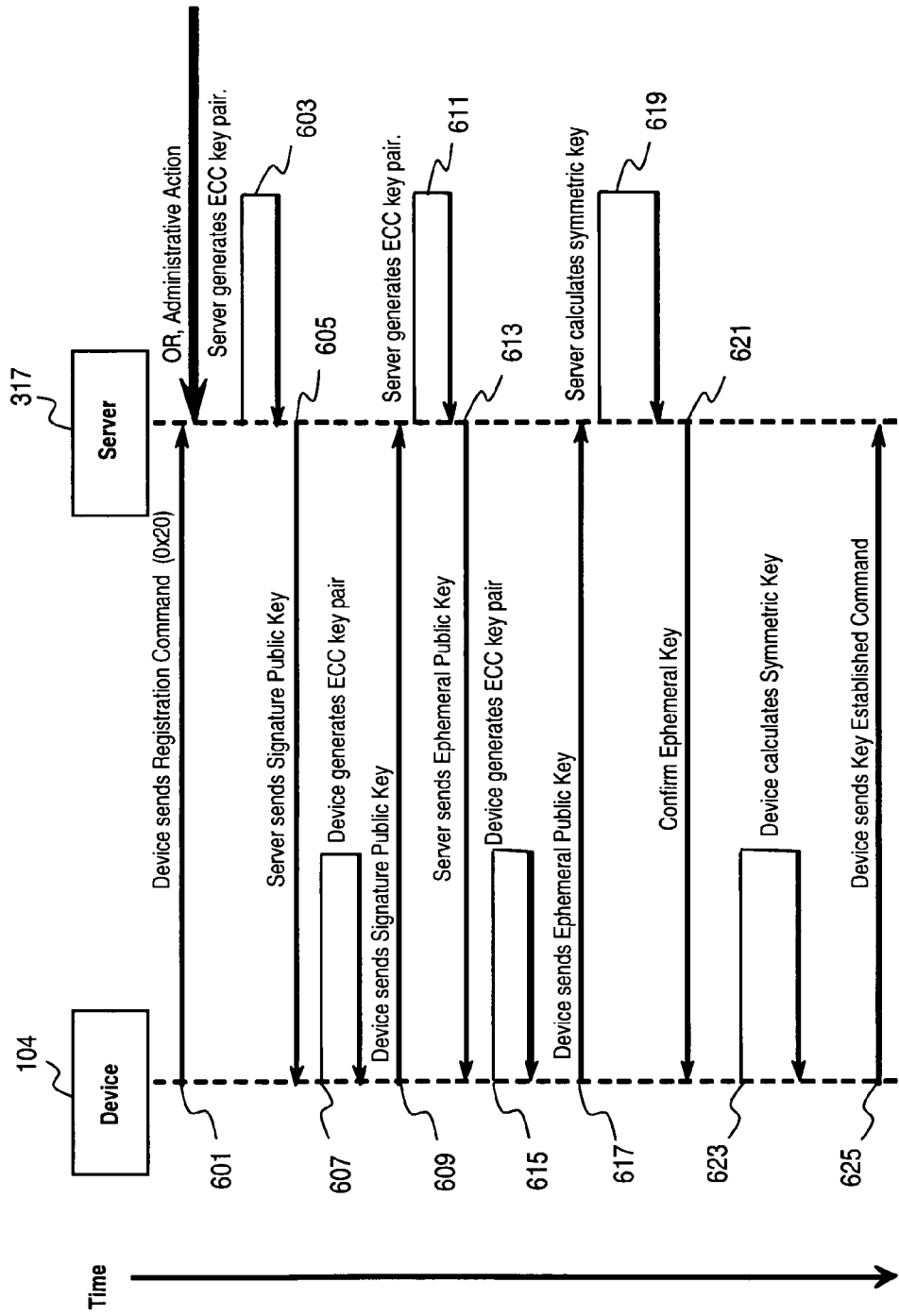
FIG. 6 is a flowchart of a process for key establishment, according to an embodiment of the present invention.
Figure 7:
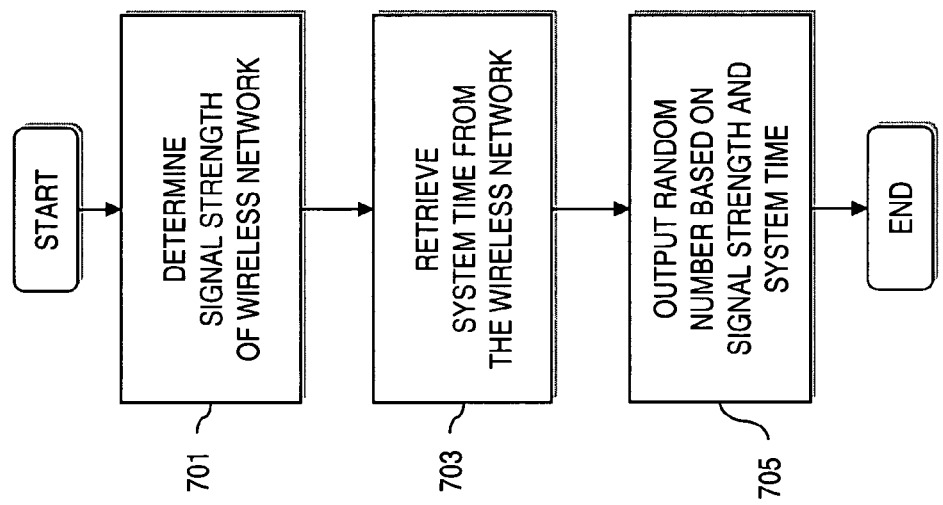
FIG. 7 is a flowchart of a process for generating keys based on signal strength, according to an embodiment of the present invention.
Figure 8:
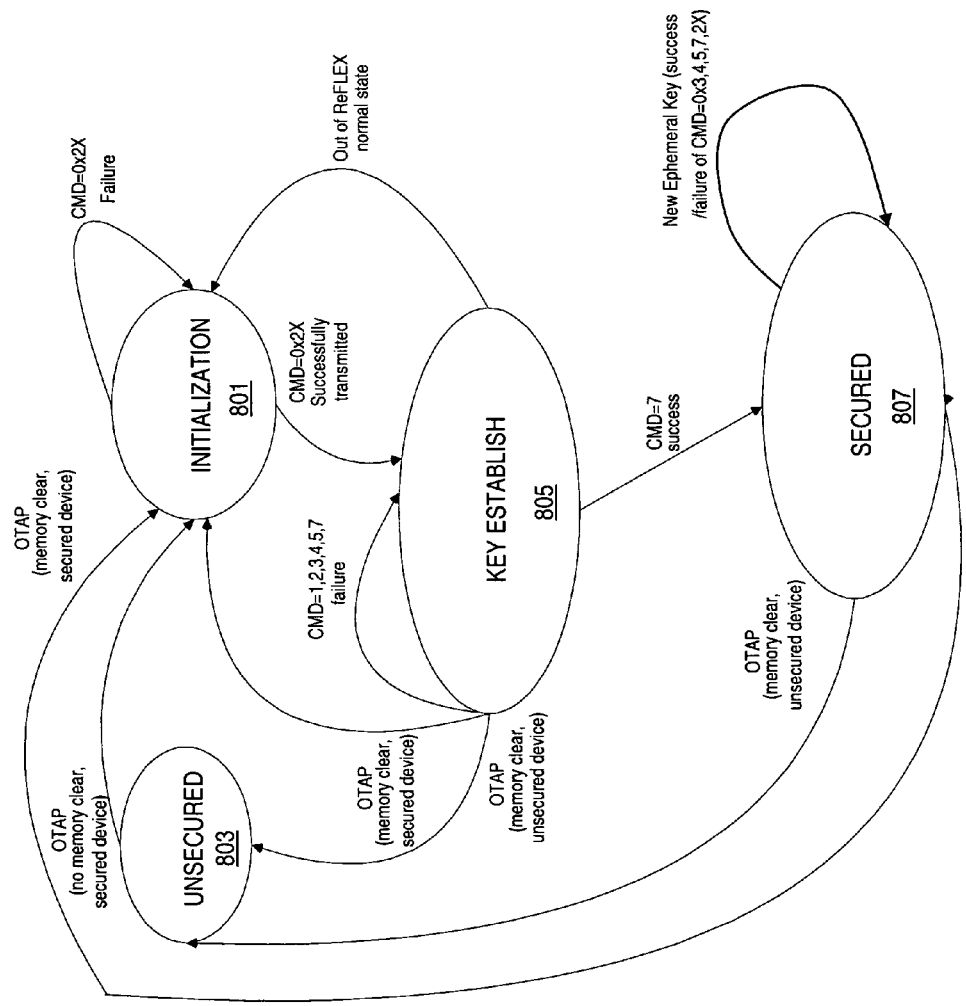
FIG. 8 is a state diagram for secure and unsecure device operation, according to an embodiment of the present invention.

Crypto logic 317 supports secure functionality, such as the encryption and key establishment processes, as described with respect to FIGS. 6-8, as well as key management functions. The logic 317 can perform a specified encryption algorithm, such as AES-CTR. The secure functionality can be enabled or disabled via Over the Air Programming (OTAP) or a programming cable/cradle. According to one embodiment of the present invention, the device 103 supports the capability of being loaded with a device specific shared secret before the device 103 is shipped to the end user. This "shared secret" memory location can be loaded with the device serial number when the unit is first shipped from the factory. Whenever the device 103 is reset to factory fresh conditions, the internal software can automatically load the "shared secret" memory location with a copy of the device serial number. When first registering, the device 104 coordinate keys per the process of FIG. 6.

Although the crypto logic 317 is described with respect to the telemetry device 103, it is recognized that the crypto logic 317 can be deployed in the 2-way messaging device 104 (e.g., a pager) for secure communication in which a display (e.g., an Liquid Crystal Display (LCD) display). In such an embodiment, the 2-way messaging device 104 can be capable of receiving both encrypted and unencrypted messages. By way of example, a flag can be used by the crypto server 209 and the device 104 to indicate whether or not all messages to or from the device 104 are encrypted. Once these indications are set, the device 104 is considered an encrypted device and all messages to/from can be sent encrypted. An icon, such as a lock, can be displayed at the top-level (main) screen indicating that the device is being operated in the secure mode. In addition, an icon (such as lock) can be displayed next to every message that's received or transmitted securely. This refers to messages in the inbox, outbox, or any other folder.

The messages within the 2-way messaging device 104, in an exemplary embodiment, is stored unencrypted. This approach simplifies the implementation on existing devices and enhances the user experience; that is, the user would not be impacted by any delay in the decryption process, as the unit need not decrypt each message before displaying. In an alternative embodiment, the messages can be stored encrypted. In such a case, it is imperative that the appropriate keys are maintained, as the messages could be rendered unreadable if a particular key associated with the messages are changed.

As an added measure of security, the 2-way messaging device 104 provides an over-the-air capability to erase all the memory within the unit. An administrator, for instance, can issue an over-the-air command to remotely erase all messages and keys in the event of loss of the device 104. This action returns the device 104 to the "factory fresh" state.

Returning to the description of the telemetry device 103, data recorded by the device 103 may additionally be stored in a storage medium other than the memory 313, such as in a flash memory 321. A log (not shown) of information may be kept so that the information may be transmitted according to a schedule, as discussed above, or, e.g., upon receipt of a request to send all data that has been collected. Storage devices have only a finite amount of space for storage of information, and thus the information for only a finite number of messages may be stored in either the memory 313 or the flash memory 321.

Figure 4:
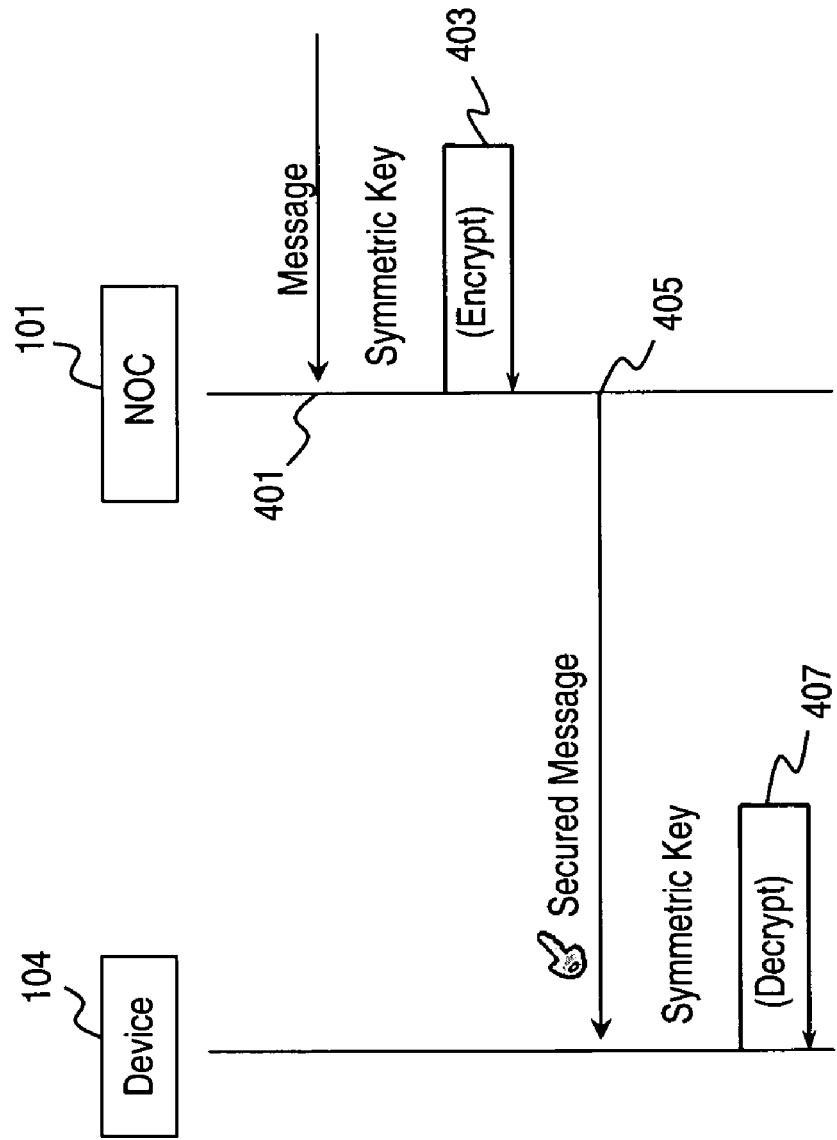
FIG. 4 is a flowchart of a forward channel encryption process, according to an embodiment of the present invention.

To improve availability of the telemetry device 103, an internal battery 319 is optionally included. With the internal battery, the telemetry device 103 can continue to monitor and transmit alerts and status information to the NOC 101 even if the electrical system of a vehicle is inoperable. Additionally, the internal battery 319 can be used by the device 103 to gracefully report power status wirelessly and shut down gracefully when the energy level of the internal battery is becoming to low to sustain operation of the device FIG. 4 is a flowchart of a forward channel encryption process, according to an embodiment of the present invention. A message arrives at the NOC 101 (per step 401) and is destined for a security enabled device. As discussed, the messages exchanged among the wireless devices 103, 104 and the NOC 101 are messages compliant with the ReFLEX™ protocol. However, other equivalent protocols can be employed. In an exemplary embodiment, message formatting of secured message are identical to unsecured messages, including reply format, time stamp, stored flag, etc.

The message is first transmitted to the crypto server 209. The crypto server 209 then determines the particular symmetric key corresponding to the device (e.g., 2-way messaging device 104) and encrypts, as in step 403, the message with the key. The message is then delivered via the wireless network 107, per step 405. Once the device 104 receives the coded message, the device decrypts the using the agreed upon symmetric key (i.e., shared secret), as in step 407, and then provide the clear text message to the user.

Figure 5:
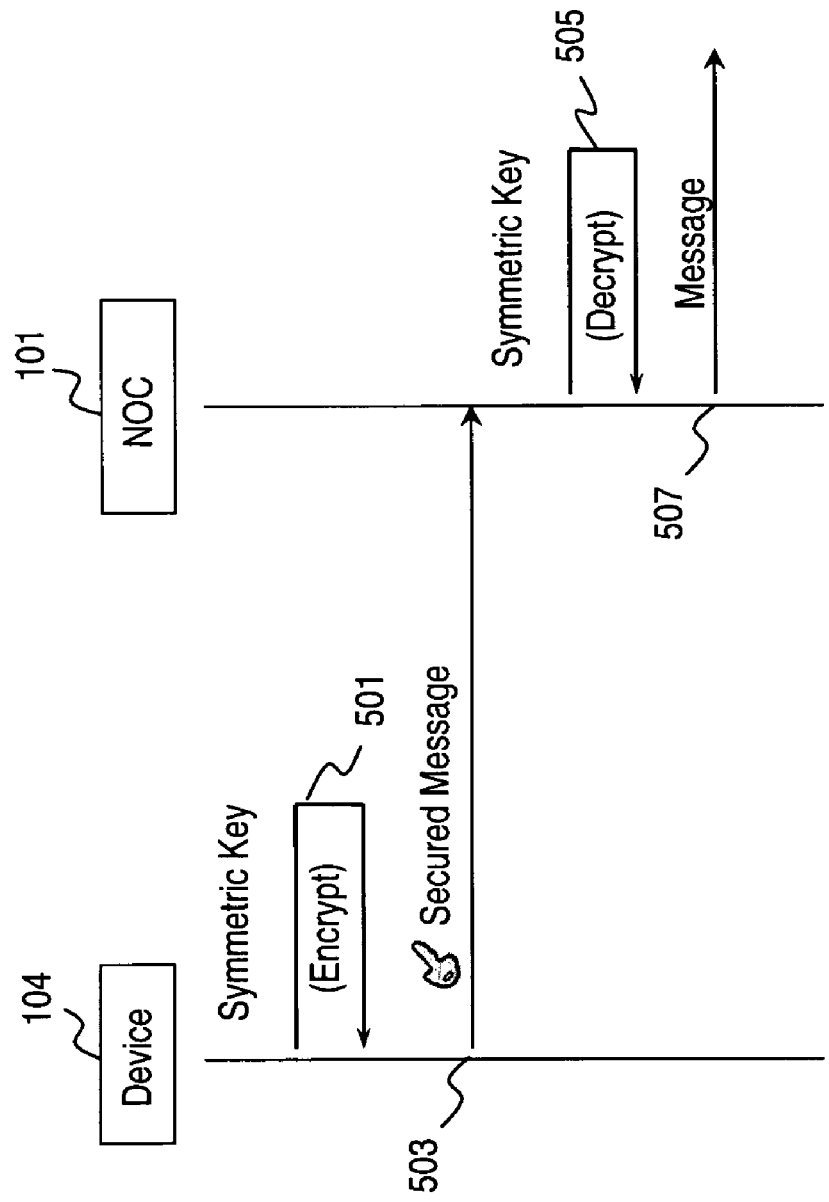
FIG. 5 is a flowchart of a reverse channel encryption process, according to an embodiment of the present invention.

FIG. 5 is a flowchart of a reverse channel encryption process, according to an embodiment of the present invention. In addition to receiving encrypted messages, the device 104 itself is also capable of encrypting messages and forwarding them over the wireless network 107. In steps 501 and 503, once a message is ready to be sent, the device 104 encrypts the message with the symmetric key and sends the secured message over the wireless network 107. When the NOC 101 receives this coded message, the NOC 101 determines whether the communication from this device 104 is always encrypted based on the device profile. For the purposes of illustration, in this case, the profile indicates that the messages are encrypted. Consequently, the NOC 101 forwards the received message to the crypto server 209, which decrypts, per step 505, the message using the agreed upon symmetric key. The clear text message is processed by the NOC 101 for normal handling and delivery (step 507).

FIG. 6 is a flowchart of a process for key establishment, according to an embodiment of the present invention. The system 100, according to one embodiment of the present invention, utilizes over-the-air key exchange to minimize the complexity to the end user in terms of ease of use and updating. In an exemplary embodiment, a public/private elliptic curve cryptography (ECC) key encryption system is utilized. Over-the-air key exchange with the device 104 complies with the communication protocol specified in PTC RFC 41 and the Station-to-Station protocol given in ANSI X9.63 using modified ECC Diffie-Hellman; each of these standards is incorporated herein by reference in their entireties. Because the process of key exchange (shown in FIG. 6) utilizes Public Key encryption and each transfer is digitally signed with the appropriate Private Key, authentication and message integrity is essentially guaranteed. Once the keys are initialized, all messages can be sent encrypted using the coordinated symmetric keys.

In one embodiment of the present invention, when the device 104 is shipped to the customer, no keys are programmed in the device 104. The keys are established over the air on the wireless network 107.

When the customer first turns on the 2-way messaging device 104, the device 104 registers with the wireless network 107 using, for example, the typical ReFLEX registration process. After a successful registration, an OTAP command is sent to the device 104 to enable security for the device 104. After the successful execution of the OTAP command, the 2-way messaging device 104 sends, per step 601, an RFC 41 command 0x20 to inform the crypto server 209 that the device 104 is ready to begin the key establishment process. As shown, this key establishment process can be initiated through administration action.

In step 603, the crypto server 209 generates an ECC key pair, and sends a Signature Public Key to the device 104 (step 605). In response, the device 104 generates the ECC key pair, and sends the Signature Public Key (per steps 607 and 609). In steps 611 and 613, the server 209 generates the ECC key pair, and sends an Ephemeral Public Key to the device 104. Accordingly, the device 104 generates the ECC key pair, and forwards an Ephemeral Public Key to the server 209 for calculation of the symmetric key (steps 617 and 619). The random seed for generating elliptic curve key pair can be calculated by XORing static random seed on device 104, the serial number of the device 104, forward channel address of the device 104, system time, and/or signal strength of network 107. Use of the signal strength and system time to determine the random seed is further described below in FIG. 7.

In step 621, the server 209 submits a confirmation message to the device 104 to confirm the Ephemeral Key. In step 623, the device 104 computes the symmetric key. Thereafter, the device 104 transmits, per step 625, a Key Established command at the end of key establishment to inform the crypto server 209 that the device 104 received the key index for the symmetric key and is ready for secured messaging.

Thus, the server 209 sends RFC 41 Commands 1, 3, and 5, and the device 104 responds with Commands 2, and 4. In addition, the device 104 sends Command 7 at the end of key establishment (after receiving Command 5) to inform the server 209 that it received the key index for the symmetric key and is ready for secured messaging.

According to one embodiment of the present invention, during the above key establishment process, the serial number of the device 104 can be used as the shared secret to minimize the risk of a man-in-the-middle attack. For example, Initialization Vectors (IV) of the device 104 and the crypto server 209 can be generated by the crypto server 209 and sent to the device 104 via RFC 41 Command 5.

Upon completion of the key establishment process, the device 104 and the NOC 101 both will have copies of the symmetric key and IVs to perform encryption.

The key establishment process requires time to execute—potentially in the order a few minutes. As a result, the process is invoked only as necessary, for instance, when the device 104 is first turned ON or in the event of a total device reset. Restricting this key establishment process to occur only upon being ON advantageously prevents unauthorized use. That is, an authorized user can readily obtain the device 104, reset the device 104, and read all the new messages. It is noted that an administrator can be authorized by the user to reset the device 104, thereby allowing the keys to be re-initiated.

In addition, during this key establishment process, the device 104 can display textual information that informs the user about the process and to wait patiently. Alternatively, an icon can be used on the main screen to indicate that the key establishment process is taking place. Upon completion of the key establishment process, the icon can be replaced with a different icon that indicates secured.

In an exemplary embodiment, the user is prevented from originating or replying to messages during the key establishment process. Thus, in essence the device 104 is not operational until the full process is complete. In the event that a timeout takes place, the crypto server 209 can restart the failed step.

The process of FIG. 6, in an exemplary embodiment, complies with ANSI X9.63-2001 §6.8 (which is incorporated herein in its entirety). Also, the individual ReFLEX™ messages can be implemented per the Paging Technical Committee (PTC) Engineering Standards and Publications document RFC 41, X9.63 Key Management Protocol; which are incorporated herein by reference in their entireties.

FIG. 7 is a flowchart of a process for generating keys based on signal strength, according to an embodiment of the present invention. As mentioned, the random seed for the key pair can be determined by a host of parameters. According to one embodiment of the present invention, the system timing information as well as the signal strength of the network 107 can be used to determine the random seed. In steps 701 and 703, the signal strength of the network 107 and the system time (or clocking information of the network 107) are acquired. The signal strength can be determined by the wireless device (e.g., telemetry device 103 and 2-way messaging device 104). Thereafter, the random seed is output based on the determined signal strength and the system time, as in step 705.

FIG. 8 is a state diagram for secure and unsecure device operation, according to an embodiment of the present invention. As shown, a wireless device, such as device 104, operating within the wireless network 107 has two modes of operation: unsecure and secure. The modes of operation is dictated based on whether a security feature on the device 104 is activated. In an exemplary embodiment, the device 104 transitions among the following states during the key establishment process: an initialization state 801, an unsecured state 803, a key establish state 805, and a secured state 807.

In the unsecured state 803, the security feature of device 104 is not enabled, thus, the device 104 communicates over the wireless network 107 in clear text. That is, all messages to and from the device 104 can be unencrypted. The device 104 can decode and display personal and IS messages received in an alphanumeric vector. Binary (personal and IS) messages are ACKed, but not displayed. Also, all Generic Over the Air Programming (GOTAP) commands are processed. Additionally, the device 104 allows the user to reply to an alphanumeric message with a custom response and/or a ReFLEX multiple-choice response (i.e., Multiple Choice Response (MCR) and canned message).

In the initialization state 801, the security feature on the device 104 can be enabled. However, in this state 801, the security keys are not yet established. Hence, the device 104 does not allow the user to originate or reply to messages. While in this state 801, the device 104 continues to send RFC 41 command 0x2X (e.g., range 0x20~0x2F). Upon successful transmission of this command, the device 104 enters into the key establish state 805.

In the key establish state 805, the symmetric keys used for encryption and decryption can be established, for example, using the station-to-station model of ANSI X9.63 ECC public key cryptography. During this state 805, the device 104 does not permit the user to originate or reply to messages. Upon successful transmission of RFC 41 Command 7, the device 104 will verify that the symmetric key has been established before moving into the secured state.

As regards error handling in the key establish state 805, if the device 104 cannot interpret the RFC 41 command or cannot validate a command, the device 104 reports an "invalid command" error to the crypto server 209.

In the secured state 807, the device 104 operates in a fully secured mode. All personal messages to and from the device 104 are encrypted. While in this state 807, new symmetric keys can be allowed to be established. If the device 104 cannot decode a secured message (RFC 30), the device 104 reports a "decode failure" error to the crypto server 209. In other words, if the device 104 receives a message with no errors and the decrypted message is not a UAR message, the device 104 reports a "decode failure" error to the crypto server 209. In addition, if the TID in UAR does not match, for instance, Analog Display Services Interface (ADSI) IV_offset then the device 104 reports a "decode failure" error. If the device 104 receives a secured message with an invalid or un-established key index, the device 104 reports an "invalid key index" error. If the device 104 receives a secured message that does not follow the RFC 30 format, the device 104 generates an "invalid format" error to the crypto server 209. If the device 104 cannot interpret an RFC 41 or cannot validate a command, the device 104 will report an "invalid command" error to the crypto server 209.

In each of the states 801, 805 and 807, the device 104 can decode and display personal and IS messages received in the alphanumeric vector. In addition, these messages, among others, are ACKed, but not displayed. Further, the GOTAP commands can be processed.

After establishment and use of the key, the system 100 also provides a mechanism for automatically changing the key, as detailed below in FIGS. 9 and 10A-10B.

Figure 9:
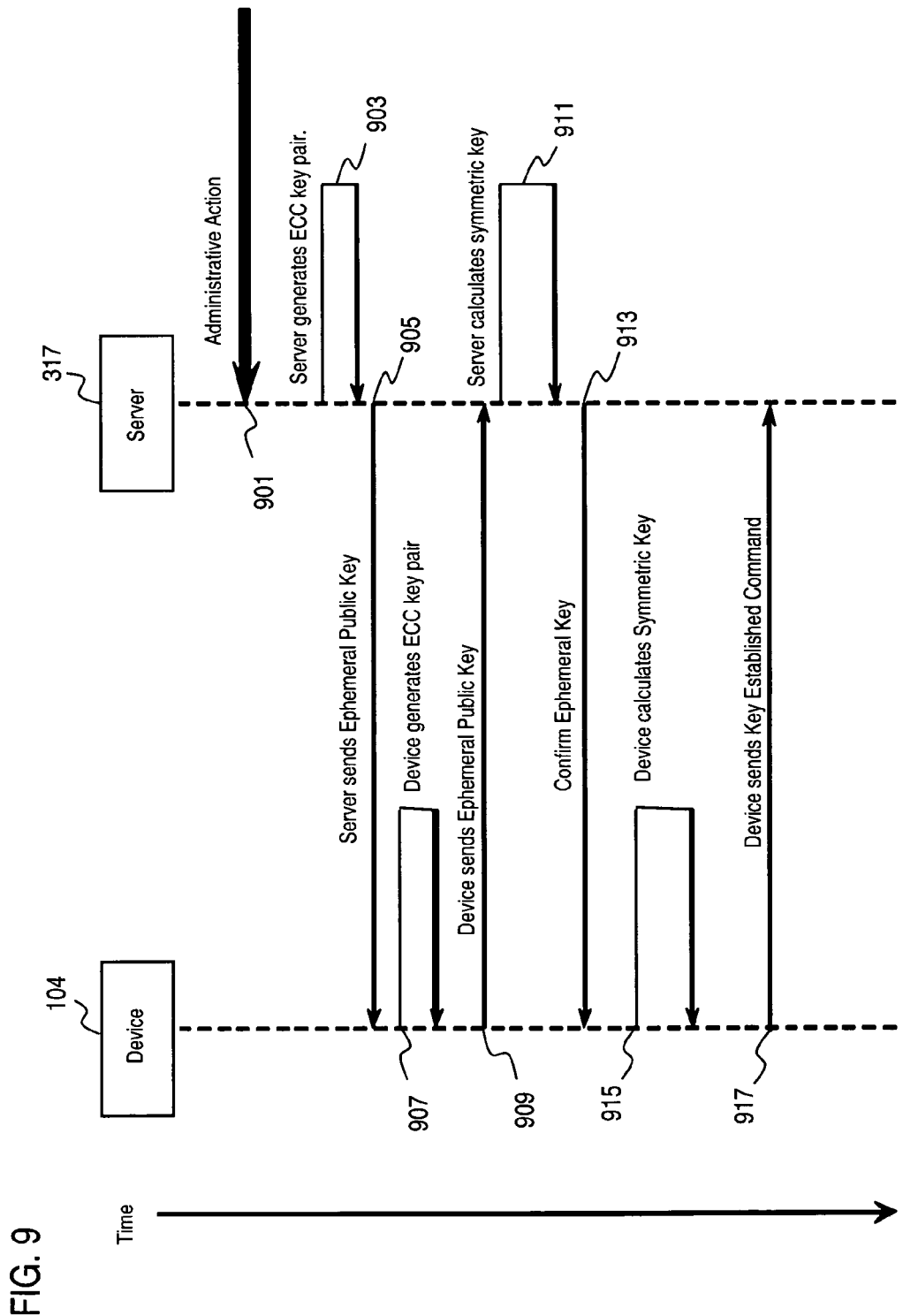
FIG. 9 is a diagram of a process for changing of keys, according to an embodiment of the present invention.

FIG. 9 is a diagram of a process for changing of keys, according to an embodiment of the present invention. Once the symmetric keys are initialized as described earlier, all user messages between the device 104 and the NOC 101 can be transferred encrypted using the symmetric key. To provide increased security, the symmetric key are changed based on event or time. The process for changing the key is more straightforward than the key initialization process. Unlike the key initialization process, this process can be transparent to the user.

In steps 901 and 903, the crypto server 209 generates an ECC key pair in response to some administrative action. The command to change keys is initiated by the crypto server 209 sending a message containing the Ephemeral Public key to the device 104. The messages, in an exemplary embodiment. Upon receipt of the Ephemeral Public key, the device 104, as in step 907, generates the ECC key pair, and sends the Ephemeral Public key to the server 209 (step 909). In step 911, the server 209 computes the symmetric key, and sends a Confirm Ephemeral Key message to the device 104, per step 913. In turn, the device 104, as in step 915, generates the symmetric key. Lastly, the device 104 issues a Key Established command to the server 209, per step 917.

Figure 10A:
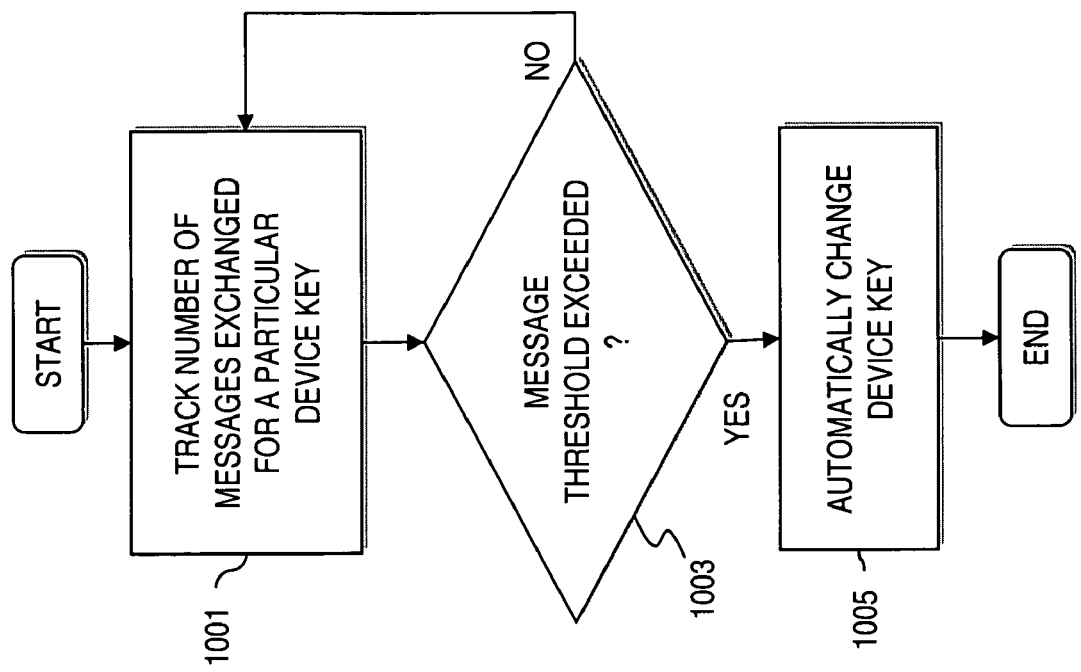
FIGS. 10A and 10B are flowcharts of processes for automatically changing device keys, according to an embodiment of the present invention.
Figure 10B:
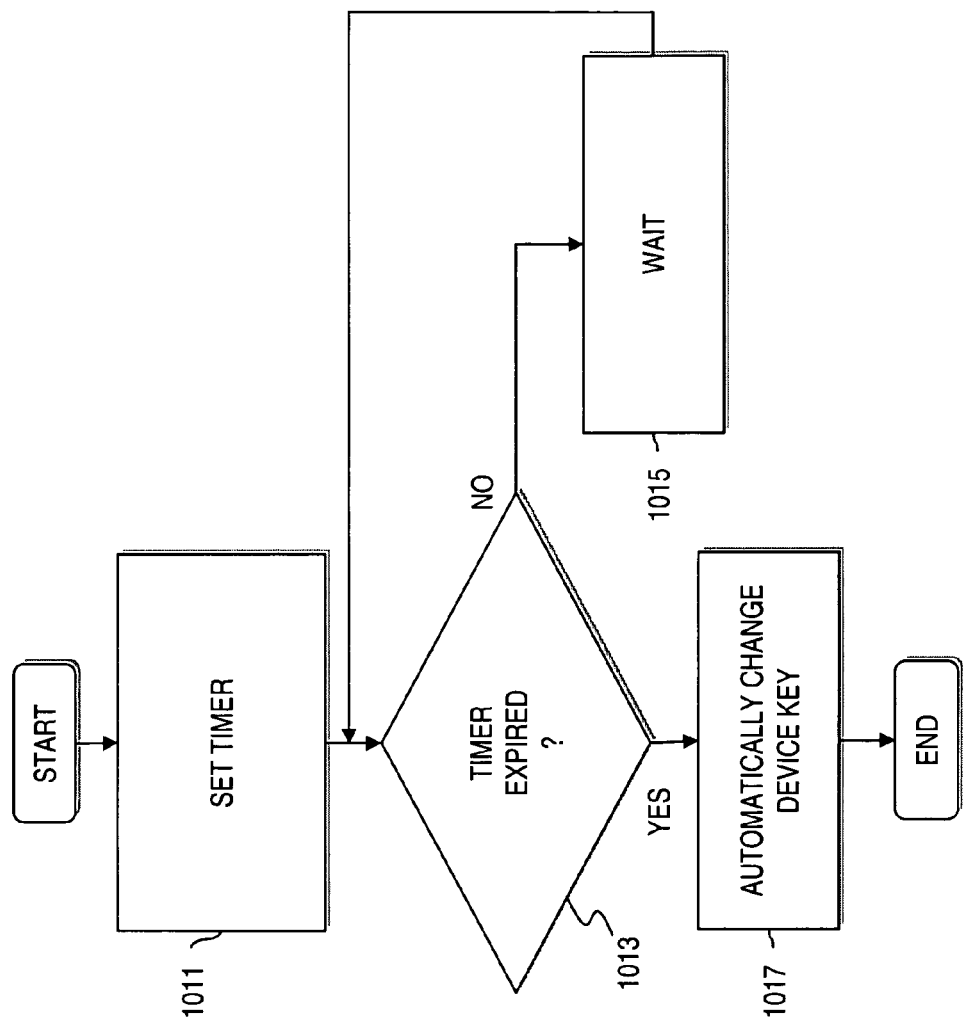
Figures 11C, 11D:
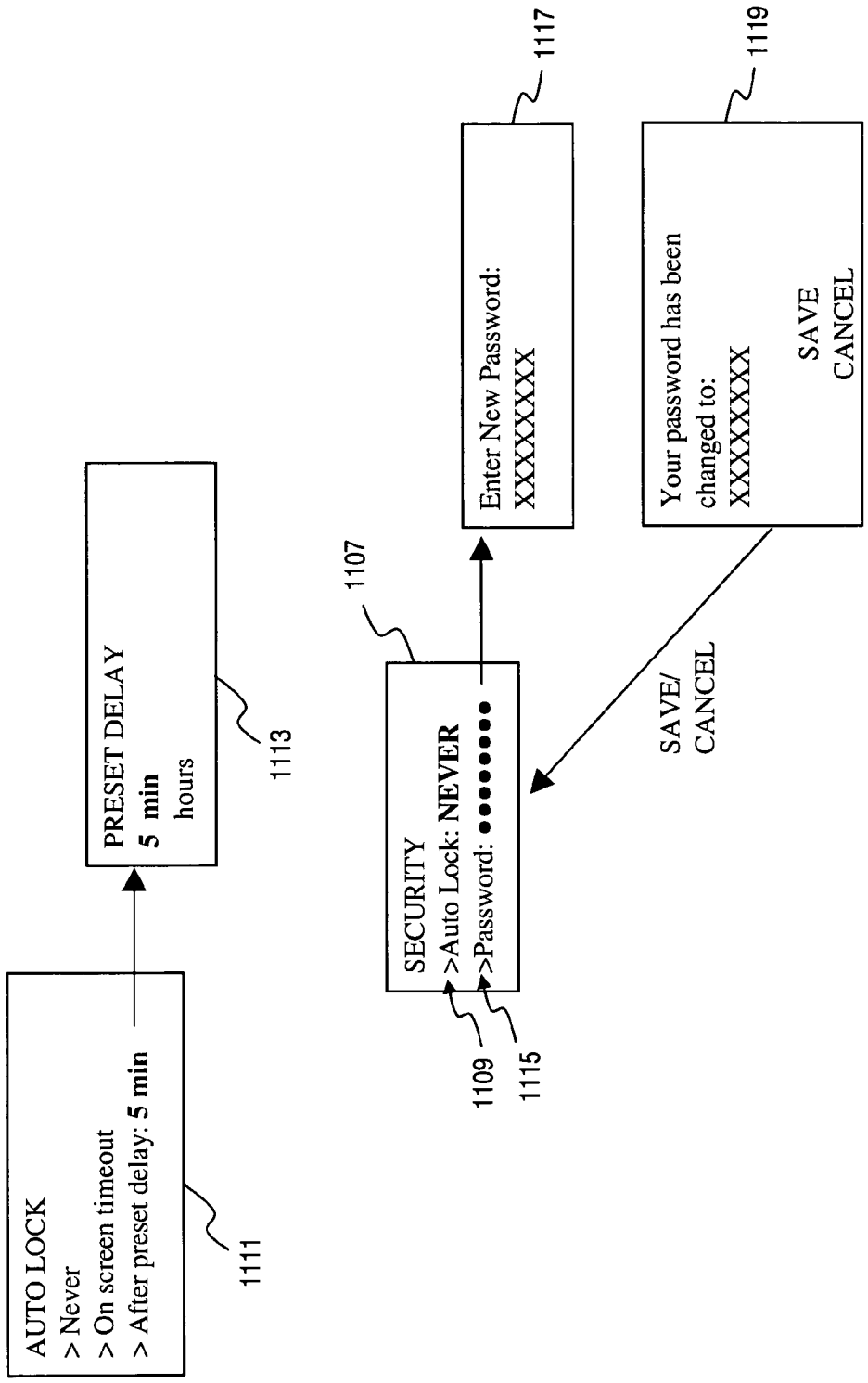

FIGS. 10A and 10B are flowcharts of processes for automatically changing device keys, according to an embodiment of the present invention. This key change process is based on the number of messages exchanged using the established symmetric key. In step 1001, the NOC 101 tracks the number of messages that have been encrypted by the device 104 utilizing a particular symmetric key. A configurable threshold value can be predetermined; for example, 5000 messages.

The NOC 101 determines whether this message threshold has been exceeded by the device 104, as in step 1003. If the message threshold is exceeded, the NOC 101 automatically notifies the device 104 to change the key, per step 1005.

This automatic key change can also be triggered based on time. As shown in FIG. 10B, the NOC 101 can set a key expiration timer, per step 1011, for determining when the key should be changed. The timer can be set, for instance, for 30 days. In step 1013, the NOC 101 checks whether the timer has expired; if not, the NOC 101 continues to wait (step 1015). Otherwise, the NOC 101, as in step 1017, initiates the automatic changing of the key.

Although the processes of FIGS. 10A and 10B are described independently, it is contemplated that both processes can be executed concurrently, such that the key can be automatically changed whenever the number of messages is exceeded or the timer is expired, whichever occurs first.

In addition to supporting a secure mode of communication over the wireless network 107, the 2-way messaging device 104 can be configured to with a menu structure to facilitate the ease of enabling such secure mode of operation.

FIG. 11A-11D are diagrams of a user interface of the devices used in the system of FIG. 1, according to an embodiment of the present invention. The menu and user interface of FIGS. 11A-11D can be readily incorporated, as appropriate, into the 2-way messaging device 104. The 2-way messaging device 104 provides an option of allowing users and/or administrators to password protect the unit. The password minimum length is a configurable option.

In one embodiment of the present invention, the secure 2-way messaging device 104 utilizes a timer that is set to an incorrect password timeout interval for preventing would-be thieves (or otherwise unauthorized users) from attempting repetitive password attacks. When an incorrect password is entered, the device 104 can "time out" for a period of time before the user can again attempt to enter the password. Each subsequent erroneous attempt will cause the timer to be doubled.

For illustrative purposes, the time out interval can be set to 5 seconds. Therefore, the first time the operator incorrectly enters a password, a wait time of 5 seconds is required before the operator can re-try. After the second unsuccessful attempt, the user will be required to wait for 10 seconds, and 20 seconds after the third attempt, and so on. This time out mechanism thus effectively deters the unauthorized user from gaining access. A suitable error message can be displayed to the user during the period of disablement.

A Preferences menu 1101 can include the addition of a "Security" item 1103 for viewing and modifying security settings for the device 104. When this item 1103 is selected, the user can be prompted to re-enter the password per a Password menu 1105. This is the device access password and is required to prevent unauthorized changes to the security settings. As the user types the password, the device 104 does not display the actual characters typed to prevent authorized users nearby from reading the information. If the password entered is incorrect, the device 104 immediately locks out the user and deposits the user at the top level entry screen and again ask for the user's password. At this point, the incorrect password timeout mechanism can be triggered to prevent access to the device 104 using repetitive guesses.

Once the password is entered correctly, the user can be presented with a Security Menu 1107. Within the Security Menu 1107, the user has the ability to enable or disable the Auto Lock mechanism, via an Auto Lock menu item 1109, and to set the device access password. The Auto Lock menu item 1109 allows the user to control access to the device 104. This particular item 1109 can be disabled by an internal flag that is only accessible via OTAP or a programming cable/cradle, thereby permitting security administrators to force their users to utilize the Auto Lock feature. Internally, the administrator can set the auto lock to any of the settings and not allow the user to make changes. When the Auto Lock feature is set by the administrator using the internal flag, the Auto Lock menu item 1109 is disabled. The device 104 can accordingly indicate the administrator selected action.

Within an Auto Lock menu 1111, the user or administrator can select, in an exemplary embodiment, one of three options: "Never", "On screen timeout", or "After preset delay." If the user selects "Never", no password is needed to access the device 104. "On screen timeout" links the password access to the normal device screen timeout. Once the device screen is blanked, the device 104 can be locked. In one embodiment of the present invention, the initial factory fresh state of the device 104 has the Auto Locked set to "Never" and the Password cleared.

The third option permits the user to select a preset delay before the pager is locked. A "Preset Delay" screen 1113 provides the user with the capability to select either minutes or hours—when one is selected, a scroll wheel (or other mechanism specific to the device) can scroll through the numbers. Valid numbers can be either 1-59 minutes or 1-24 hours. Once selected, the entered delay period will be displayed on the Auto Lock menu screen 1111.

In accordance with one embodiment of the present invention, when locked (i.e., "auto lock state"), the device 104 responds to the following "outside originated" commands: "Reset" to factory fresh condition via OTAP, clearing all of the device's memory; HIX 0 (zero) via OTAP which will completely disable the unit; and "Reset" to factory fresh condition via the programming cable/cradle, clearing all of the device's memory. In the Auto Lock state, no other commands sent via the programming cable/cradle can be responded to or performed. However, the device 104 can still process all incoming REFLEX messages (including secure, unsecured, IS, and GOTAP) when in the locked state.

From the Security menu 1107, a Password menu item 1115 enables the user to change the device access password. When the user selects the "Password" menu item 1115, the user enters a change password screen 1117 that prompts the user for a new password. It is noted that a prompt for the old password is not needed, as the user gained access to the Security menu 1107 using the old password. The characters of the new password can be displayed to provide feedback to the user, thereby ensuring accuracy of the entry. It is assumed that the user changes passwords when the user is assured that no unauthorized person is attempting to view the passwords.

Once the password is entered, the device 104 re-displays the password, in a Confirmation screen 1119, to confirm that the user is fully aware of the characters typed. If the new password is not what the user wanted, the user can select "Cancel" and be returned to the "Security" menu 1107 with the password unchanged. If the password is acceptable, the user selects "SAVE" and is returned to the "Security" menu 1107 with the password changed.

Figure 12:
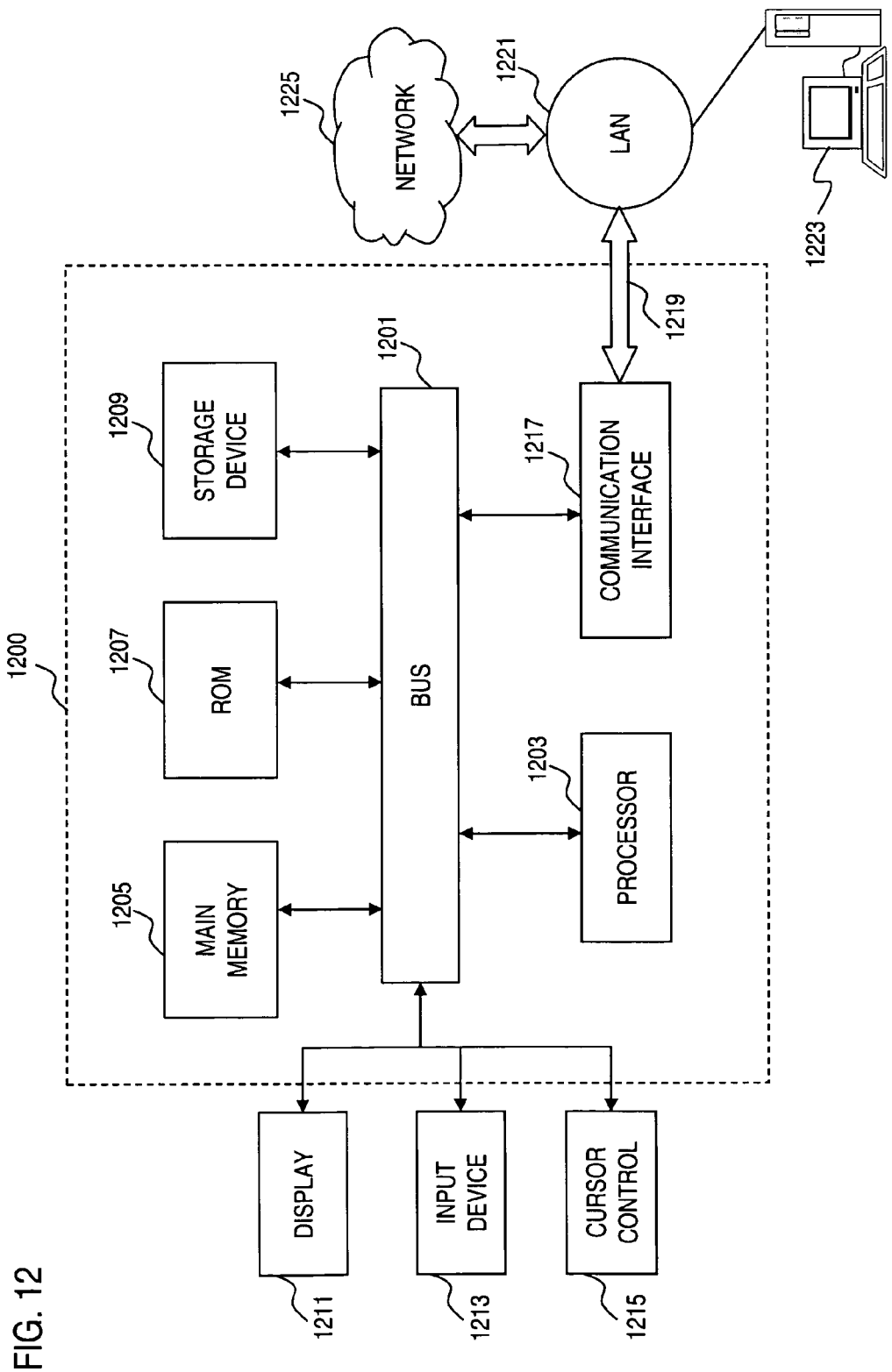
FIG. 12 is a diagram of a computer system that can be used to implement an embodiment of the present invention.

FIG. 12 illustrates a computer system 1200 upon which an embodiment according to the present invention can be implemented. For example, the client and server processes for supporting fleet and asset management can be implemented using the computer system 1200. The computer system 1200 includes a bus 1201 or other communication mechanism for communicating information and a processor 1203 coupled to the bus 1201 for processing information. The computer system 1200 also includes main memory 1205, such as a random access memory (RAM) or other dynamic storage device, coupled to the bus 1201 for storing information and instructions to be executed by the processor 1203. Main memory 1205 can also be used for storing temporary variables or other intermediate information during execution of instructions by the processor 1203. The computer system 1200 may further include a read only memory (ROM) 1207 or other static storage device coupled to the bus 1201 for storing static information and instructions for the processor 1203. A storage device 1209, such as a magnetic disk or optical disk, is coupled to the bus 1201 for persistently storing information and instructions.

The computer system 1200 may be coupled via the bus 1201 to a display 1211, such as a cathode ray tube (CRT), liquid crystal display, active matrix display, or plasma display, for displaying information to a computer user. An input device 1213, such as a keyboard including alphanumeric and other keys, is coupled to the bus 1201 for communicating information and command selections to the processor 1203. Another type of user input device is a cursor control 1215, such as a mouse, a trackball, or cursor direction keys, for communicating direction information and command selections to the processor 1203 and for controlling cursor movement on the display 1211.

According to one embodiment of the invention, the processes of FIGS. 4-10 are performed by the computer system 1200, in response to the processor 1203 executing an arrangement of instructions contained in main memory 1205. Such instructions can be read into main memory 1205 from another computer-readable medium, such as the storage device 1209. Execution of the arrangement of instructions contained in main memory 1205 causes the processor 1203 to perform the process steps described herein. One or more processors in a multi-processing arrangement may also be employed to execute the instructions contained in main memory 1205. In alternative embodiments, hard-wired circuitry may be used in place of or in combination with software instructions to implement the embodiment of the present invention. Thus, embodiments of the present invention are not limited to any specific combination of hardware circuitry and software.

The computer system 1200 also includes a communication interface 1217 coupled to bus 1201. The communication interface 1217 provides a two-way data communication coupling to a network link 1219 connected to a local network 1221. For example, the communication interface 1217 may be a digital subscriber line (DSL) card or modem, an integrated services digital network (ISDN) card, a cable modem, a telephone modem, or any other communication interface to provide a data communication connection to a corresponding type of communication line. As another example, communication interface 1217 may be a local area network (LAN) card (e.g. for Ethernet™ or an Asynchronous Transfer Model (ATM) network) to provide a data communication connection to a compatible LAN. Wireless links can also be implemented. In any such implementation, communication interface 1217 sends and receives electrical, electromagnetic, or optical signals that carry digital data streams representing various types of information. Further, the communication interface 1217 can include peripheral interface devices, such as a Universal Serial Bus (USB) interface, a PCMCIA (Personal Computer Memory Card International Association) interface, etc. Although a single communication interface 1217 is depicted in FIG. 12, multiple communication interfaces can also be employed.

The network link 1219 typically provides data communication through one or more networks to other data devices. For example, the network link 1219 may provide a connection through local network 1221 to a host computer 1223, which has connectivity to a network 1225 (e.g. a wide area network (WAN) or the global packet data communication network now commonly referred to as the "Internet") or to data equipment operated by a service provider. The local network 1221 and the network 1225 both use electrical, electromagnetic, or optical signals to convey information and instructions. The signals through the various networks and the signals on the network link 1219 and through the communication interface 1217, which communicate digital data with the computer system 1200, are exemplary forms of carrier waves bearing the information and instructions.

The computer system 1200 can send messages and receive data, including program code, through the network(s), the network link 1219, and the communication interface 1217. In the Internet example, a server (not shown) might transmit requested code belonging to an application program for implementing an embodiment of the present invention through the network 1225, the local network 1221 and the communication interface 1217. The processor 1203 may execute the transmitted code while being received and/or store the code in the storage device 1209, or other non-volatile storage for later execution. In this manner, the computer system 1200 may obtain application code in the form of a carrier wave.

The term "computer-readable medium" as used herein refers to any medium that participates in providing instructions to the processor 1203 for execution. Such a medium may take many forms, including but not limited to non-volatile media, volatile media, and transmission media. Non-volatile media include, for example, optical or magnetic disks, such as the storage device 1209. Volatile media include dynamic memory, such as main memory 1205. Transmission media include coaxial cables, copper wire and fiber optics, including the wires that comprise the bus 1201. Transmission media can also take the form of acoustic, optical, or electromagnetic waves, such as those generated during radio frequency (RF) and infrared (IR) data communications. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, and EPROM, a FLASH-EPROM, any other memory chip or cartridge, a carrier wave, or any other medium from which a computer can read.

Various forms of computer-readable media may be involved in providing instructions to a processor for execution. For example, the instructions for carrying out at least part of the present invention may initially be borne on a magnetic disk of a remote computer. In such a scenario, the remote computer loads the instructions into main memory and sends the instructions over a telephone line using a modem. A modem of a local computer system receives the data on the telephone line and uses an infrared transmitter to convert the data to an infrared signal and transmit the infrared signal to a portable computing device, such as a personal digital assistant (PDA) or a laptop. An infrared detector on the portable computing device receives the information and instructions borne by the infrared signal and places the data on a bus. The bus conveys the data to main memory, from which a processor retrieves and executes the instructions. The instructions received by main memory can optionally be stored on storage device either before or after execution by processor.

While the present invention has been described in connection with a number of embodiments and implementations, the present invention is not so limited but covers various obvious modifications and equivalent arrangements, which fall within the purview of the appended claims.

What is claimed is:

1. A method for communicating in a wireless network, the method comprising:
    generating a command to enable a secure mode of operation for a wireless device, wherein the wireless device is configured to operate in a secure mode and an unsecure mode in support of two-way messaging;
    transmitting the command to the wireless device to activate the secure mode of operation, wherein the secure mode of operation provides transmission of an encrypted message by the wireless device over the wireless network;
    establishing a shared secret key with the wireless device, wherein the shared secret key is utilized to output the encrypted message;
    obtaining signal strength of the wireless network with respect to the wireless device; and
    determining a random seed based on the signal strength, wherein the random seed is used to determine the shared secret key.

2. A method according to claim 1, further comprising: obtaining system time of the wireless network, wherein the random seed is further based on the system time.

3. A method according to claim 1, further comprising: establishing a new shared secret key with the wireless device upon expiration of a timer or exceeding a message threshold, wherein the message threshold specifies the number of messages encrypted with the prior shared secret key.

4. A method according to claim 3, further comprising: indexing the shared secret keys; and transmitting, to the wireless device, an index value corresponding to one of the shared secret keys, wherein the wireless device selects the one shared secret key based on the received index value.

5. A method according to claim 1, further comprising: generating a management command for controlling security features of the wireless device; and transmitting the management command to the wireless device over the wireless network.

6. A method according to claim 1, wherein the security features include disabling the secure mode of operation, clearing memory of the wireless device, or auto locking to prevent user access to the wireless device.

7. A method according to claim 1, wherein the wireless device is one of a two-way pager or a telemetry device.

8. A network apparatus for supporting secure communication over a wireless network, the apparatus comprising:
    a processor configured to generate a command to enable a secure mode of operation for a wireless device and to establish a shared secret key with the wireless device, the shared secret key being utilized to output an encrypted message and the wireless device is configured to operate in a secure mode and an unsecure mode in support of two-way messaging, and the processor is further configured to obtain signal strength of the wireless network with respect to the wireless device and to determine a random seed based on the signal strength, the random seed being used to determine the shared secret key, and
    a communication interface configured to transmit the command to the wireless device to activate the secure mode of operation, wherein the secure mode of operation provides transmission of the encrypted message by the wireless device over the wireless network.

9. An apparatus according to claim 8, wherein the system time of the wireless network is obtained, the random seed being further based on the system time.

10. An apparatus according to claim 8, wherein the processor is further configured to establish a new shared secret key with the wireless device upon expiration of a timer or exceeding a message threshold, the message threshold specifying the number of messages encrypted with the prior shared secret key.

11. An apparatus according to claim 10, wherein the processor is further configured to index the shared secret keys, and the communication interface transmits, to the wireless device, an index value corresponding to one of the shared secret keys, the wireless device selecting the one shared secret key based on the received index value.

12. An apparatus according to claim 8, wherein the processor is further configured to generate a management command for controlling security features of the wireless device, and the communication interface transmits the management command to the wireless device over the wireless network.

13. An apparatus according to claim 8, wherein the security features include disabling the secure mode of operation, clearing memory of the wireless device, or auto locking to prevent user access to the wireless device.

14. An apparatus according to claim 8, wherein the wireless device is one of a two-way pager or a telemetry device.

15. A method for communicating in a wireless network, the method comprising:
    switching from an unsecure mode of operation to a secure mode of operation;
    establishing a shared secret key with a cryptographic server over the wireless network in support of two-way messaging;
    generating an encrypted message using the shared secret key;
    obtaining signal strength of the wireless network; and
    determining a random seed based on the signal strength, wherein the random seed is used to determine the shared secret key.

16. A method according to claim 15, further comprising: obtaining system time of the wireless network, wherein the random seed is further based on the system time.

17. A method according to claim 15, further comprising: establishing a new shared secret key with the cryptographic server upon expiration of a timer or exceeding a message threshold, wherein the message threshold specifies the number of messages encrypted with the prior shared secret key.

18. A method according to claim 17, further comprising: indexing the shared secret keys; receiving, from the cryptographic server, an index value corresponding to one of the shared secret keys; and selecting the one shared secret key based on the received index value.

19. A method according to claim 15, further comprising: receiving a management command for controlling one or more security features; and manipulating the security features based on the management command.

20. A method according to claim 15, wherein the security features include disabling the secure mode of operation, clearing memory of the wireless device, or auto locking to prevent user access.

21. A device for communicating in a wireless network, the device comprising:
    means for switching from an unsecure mode of operation to a secure mode of operation;
    means for establishing a shared secret key with a cryptographic server over the wireless network in support of two-way messaging;

means for generating an encrypted message using the shared secret key;

means for obtaining signal strength of the wireless network; and means for determining a random seed based on the signal strength, wherein the random seed is used to determine the shared secret key.

22. A device according to claim 21, further comprising: means for obtaining system time of the wireless network, wherein the random seed is further based on the system time.

23. A device according to claim 21, further comprising: means for establishing a new shared secret key with the cryptographic server upon expiration of a timer or exceeding a message threshold, wherein the message threshold specifies the number of messages encrypted with the prior shared secret key.

24. A device according to claim 23, further comprising: means for indexing the shared secret keys; means for receiving, from the cryptographic server, an index value corresponding to one of the shared secret keys; and means for selecting the one shared secret key based on the received index value.

25. A device according to claim 21, further comprising: means for receiving a management command for controlling one or more security features; and means for manipulating the security features based on the management command.

26. A device according to claim 21, wherein the security features include disabling the secure mode of operation, clearing memory of the wireless device, or auto locking to prevent user access to the device.

27. A device according to claim 21, wherein the device is a pager or telemetry device.

* * * * *